(12) United States Patent
Duppong et al.

(10) Patent No.: US 9,957,001 B1
(45) Date of Patent: May 1, 2018

(54) BALLAST ASSEMBLY FOR A WORK VEHICLE

(71) Applicant: Deere & Company, Moline, IL (US)

(72) Inventors: Steven A. Duppong, Cedar Falls, IA (US); David Rix, Lehi, UT (US); Gary S. Keys, II, Cedar Falls, IA (US); Kendall L. Giesmann, Waverly, IA (US); Eric M. Forbes, Oconomowoc, WI (US); Nicholas Taylor, Sandy, UT (US); Razvan Platon, Salt Lake City, UT (US); Andrew W Keenan, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days. days.

(21) Appl. No.: 15/341,681

(22) Filed: Nov. 2, 2016

(51) Int. Cl.
*B62D 49/08* (2006.01)
*B62D 49/06* (2006.01)

(52) U.S. Cl.
CPC ....... *B62D 49/085* (2013.01); *B62D 49/0628* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,722,320 A | * | 11/1955 | Carlson | B62D 49/085 212/196 |
| 2,891,681 A | * | 6/1959 | Greivell | B62D 49/085 212/196 |
| 3,135,404 A | * | 6/1964 | Pilch | B62D 49/085 212/178 |
| 3,220,582 A | * | 11/1965 | Pilch | B62D 49/085 172/611 |
| 4,659,102 A | * | 4/1987 | Stuhrmann | A01B 59/048 172/275 |

(Continued)

FOREIGN PATENT DOCUMENTS

| | | | | |
|---|---|---|---|---|
| DE | 2059208 A1 | * | 6/1972 | .......... A01B 59/062 |
| DE | 2512721 A1 | * | 9/1976 | .......... B62D 49/085 |

(Continued)

OTHER PUBLICATIONS

FG Insight, "Agritechnica 2015 preview: Celebrating innovation as this year's winners are announced; John Deere EZ Ballast" [online]. Oct. 23, 2015. Retrieved on Oct. 24, 2016. Retrieved from the Internet: URL <https://www.fginsight.com/news/news/agritechnica-2015-preview-celebrating-innovation-as-this-years-winners-are-announced-7252>.

(Continued)

*Primary Examiner* — Nicole T Verley

(57) ABSTRACT

A ballast assembly for a work vehicle. The ballast assembly includes a frame, a ballast weight, and a lift. The frame is included in an underside of the work vehicle. The ballast weight has a first portion and a second portion. The lift has an upper end pivotally coupled to the frame and a lower end releasably coupled to the ballast weight. The first and second portions are configured to engage with a ground surface and the frame, respectively, when the ballast weight is loaded onto the work vehicle. The first and second portions are configured to engage with the frame when the ballast weight is loaded onto the work vehicle.

17 Claims, 20 Drawing Sheets

(56) References Cited

U.S. PATENT DOCUMENTS

| | | | | |
|---|---|---|---|---|
| 6,227,304 | B1* | 5/2001 | Schlegel | A01B 59/064 172/439 |
| 6,533,319 | B1* | 3/2003 | Denby | A01B 59/06 172/439 |
| 7,354,066 | B2* | 4/2008 | Yamamoto | B62D 49/085 280/759 |
| 8,201,849 | B2* | 6/2012 | Bauer | B62D 49/0628 172/611 |
| 8,434,787 | B2* | 5/2013 | Halepatali | E02F 3/627 212/178 |
| 8,800,976 | B2* | 8/2014 | Bethina | B60N 2/502 267/131 |
| 8,925,964 | B1* | 1/2015 | Duppong | B62D 49/085 212/195 |
| 9,663,158 | B2* | 5/2017 | Jutz | B62D 49/0628 |
| 2005/0226707 | A1* | 10/2005 | Quenzi | B60P 1/02 414/482 |
| 2008/0008528 | A1* | 1/2008 | Hey | B63C 3/06 405/3 |
| 2008/0129028 | A1* | 6/2008 | Hamm | B62D 49/085 280/759 |
| 2010/0117346 | A1* | 5/2010 | Bauer | B62D 49/0628 280/758 |
| 2015/0097362 | A1* | 4/2015 | Jutz | B62D 49/0628 280/759 |
| 2016/0059912 | A1* | 3/2016 | Fujimoto | B62D 49/0628 280/755 |

FOREIGN PATENT DOCUMENTS

| | | | | |
|---|---|---|---|---|
| DE | 3000696 | A1 * | 7/1981 | B60K 15/06 |
| DE | 3223990 | A1 * | 12/1983 | B62D 49/085 |
| DE | 3801895 | A1 * | 8/1989 | A01B 59/064 |
| DE | 102012011265 | A1 * | 12/2013 | B62D 49/085 |
| EP | 0087203 | A2 | 8/1983 | |
| EP | 2380804 | A1 * | 10/2011 | B60Q 1/2661 |
| FR | 2431414 | A1 | 2/1980 | |
| JP | 2014205368 | A * | 10/2014 | B62D 49/0628 |
| JP | 2015085936 | A * | 5/2015 | B62D 49/085 |
| WO | WO-0221898 | A1 * | 3/2002 | A01B 59/048 |

OTHER PUBLICATIONS

Agro Nalpo, "Öt aranyérmes és 44 ezüstérmes fejlesztés a 2015-ös Agritechnica vásáron; John Deere EZ Ballast/John Deere GmbH & Co. KG" [online]. Sep. 11, 2015. Retrieved on Oct. 24, 2016. Retrieved from the Internet: URL <http://www.agronaplo.hu/hirek/ot-aranyermes-es-44-ezustermes-fejlesztes-a-2015-os-agritechnican>.

* cited by examiner

BALLAST ASSEMBLY FOR A WORK VEHICLE

FIELD OF THE DISCLOSURE

The present disclosure relates to a ballast assembly for a work vehicle.

BACKGROUND OF THE DISCLOSURE

It is known to ballast work vehicles, such as a tractors, to accommodate for various implements attached thereto. Suitcase weights may be mounted to the front of the vehicle when forward located ballast is desired, while wheel weights may be attached to the rear wheels of the vehicle when rearward located ballast is desired.

In some instances, an operator of the vehicle may want to adjust the ballast of the vehicle. For example, the operator may want to increase the ballast, so as to increase the maximum tractive force when performing heavy draft field operations. Or alternatively, the operator may want to decrease the ballast, so as to improve fuel efficiency, increase payload capability, and increase the amount that can be hauled when there are weight limits associated with a combination of the vehicle and a towed implement.

SUMMARY OF THE DISCLOSURE

Disclosed is a ballast assembly for a work vehicle that includes a frame, a ballast weight, and a lift. The frame is included in an underside of the work vehicle. The ballast weight has a first portion and a second portion. And the lift has an upper end pivotally coupled to the frame and a lower end releasably coupled to the ballast weight. The first and second portions engage with a ground surface and the frame, respectively, when the ballast weight is being loaded onto the work vehicle. In contrast, both the first and second portions engage with the frame when the ballast weight is loaded onto the work vehicle. Such a ballast assembly can be efficiently loaded onto, and efficiently unloaded from, the underside of the vehicle.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
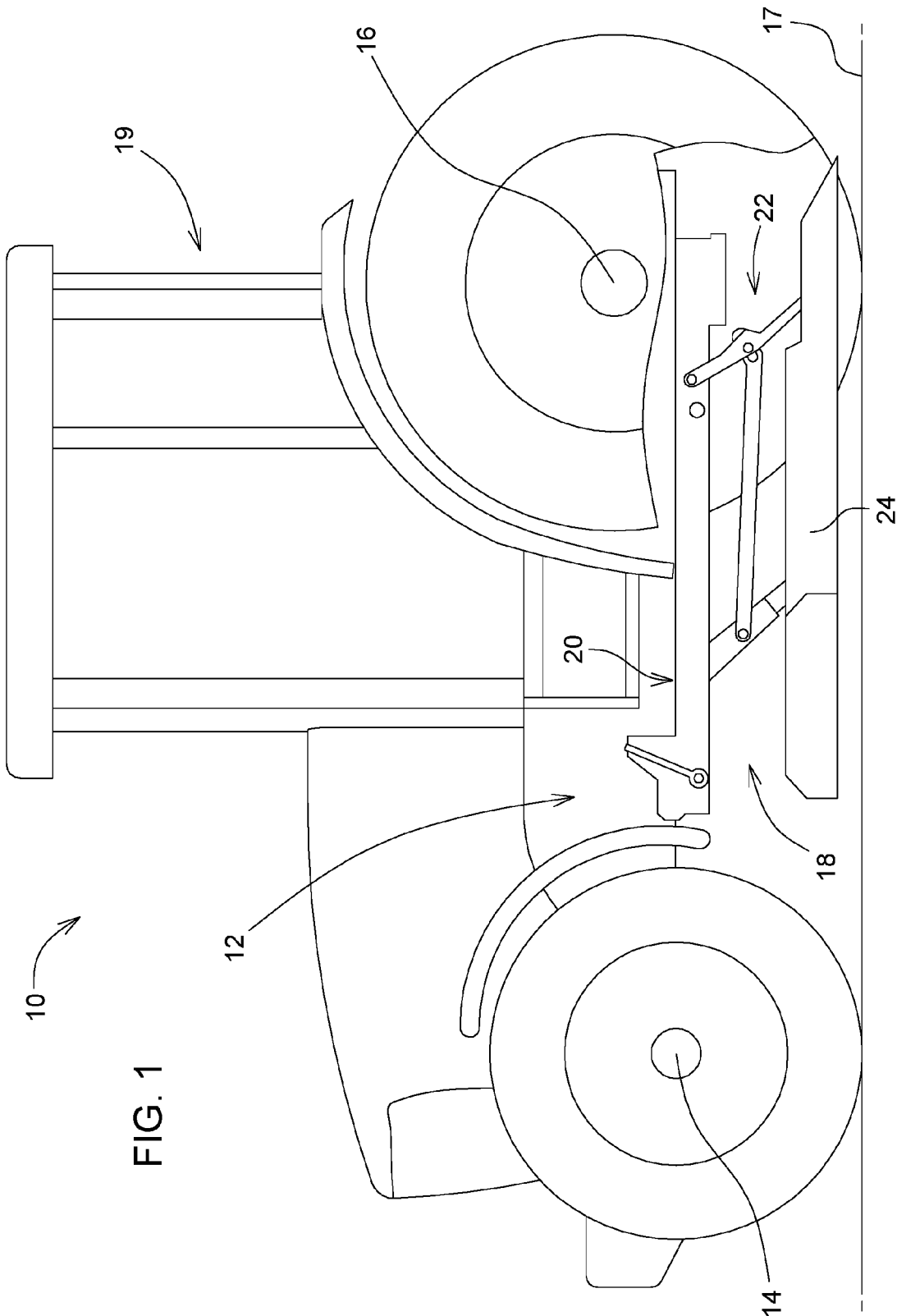
FIG. 1 is a simplified side view of a work vehicle with a first embodiment of a ballast assembly.
Figure 2:
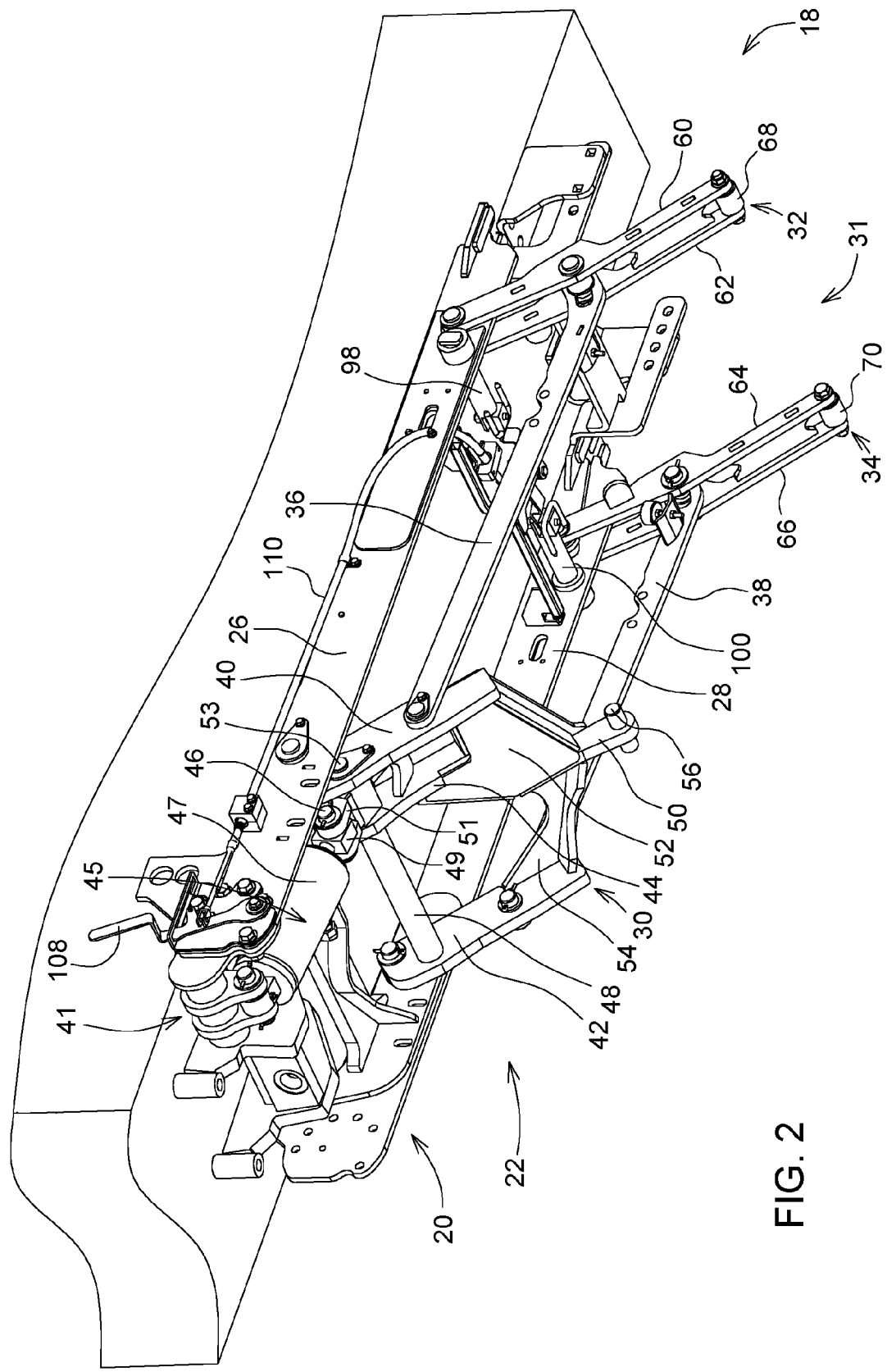
FIG. 2 is a bottom side perspective view of the first ballast assembly.
Figure 3:
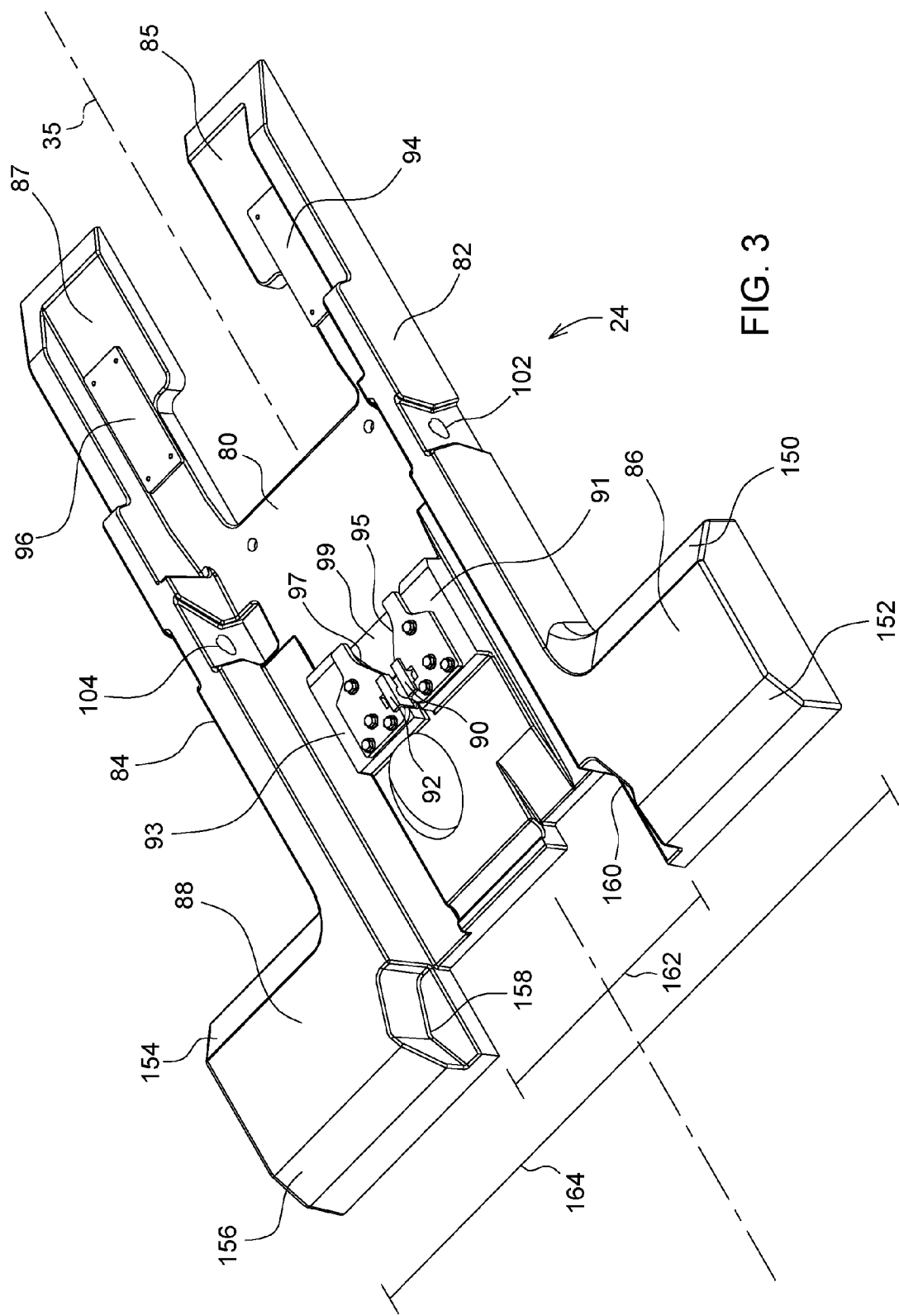
FIG. 3 is a top side perspective view of a first embodiment of a ballast weight.
Figure 4:
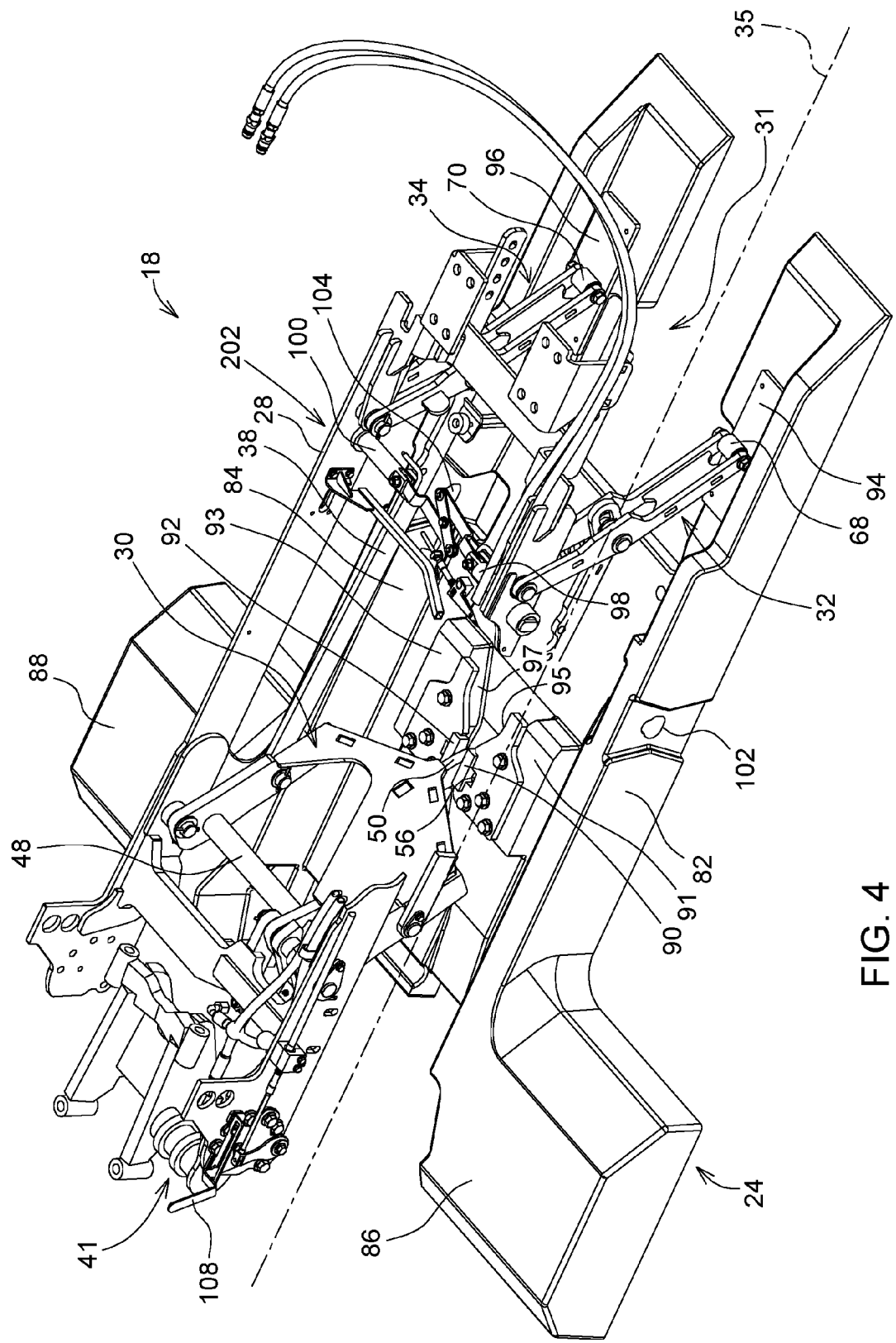
FIG. 4 is a top perspective view of the first ballast assembly.
Figure 5:
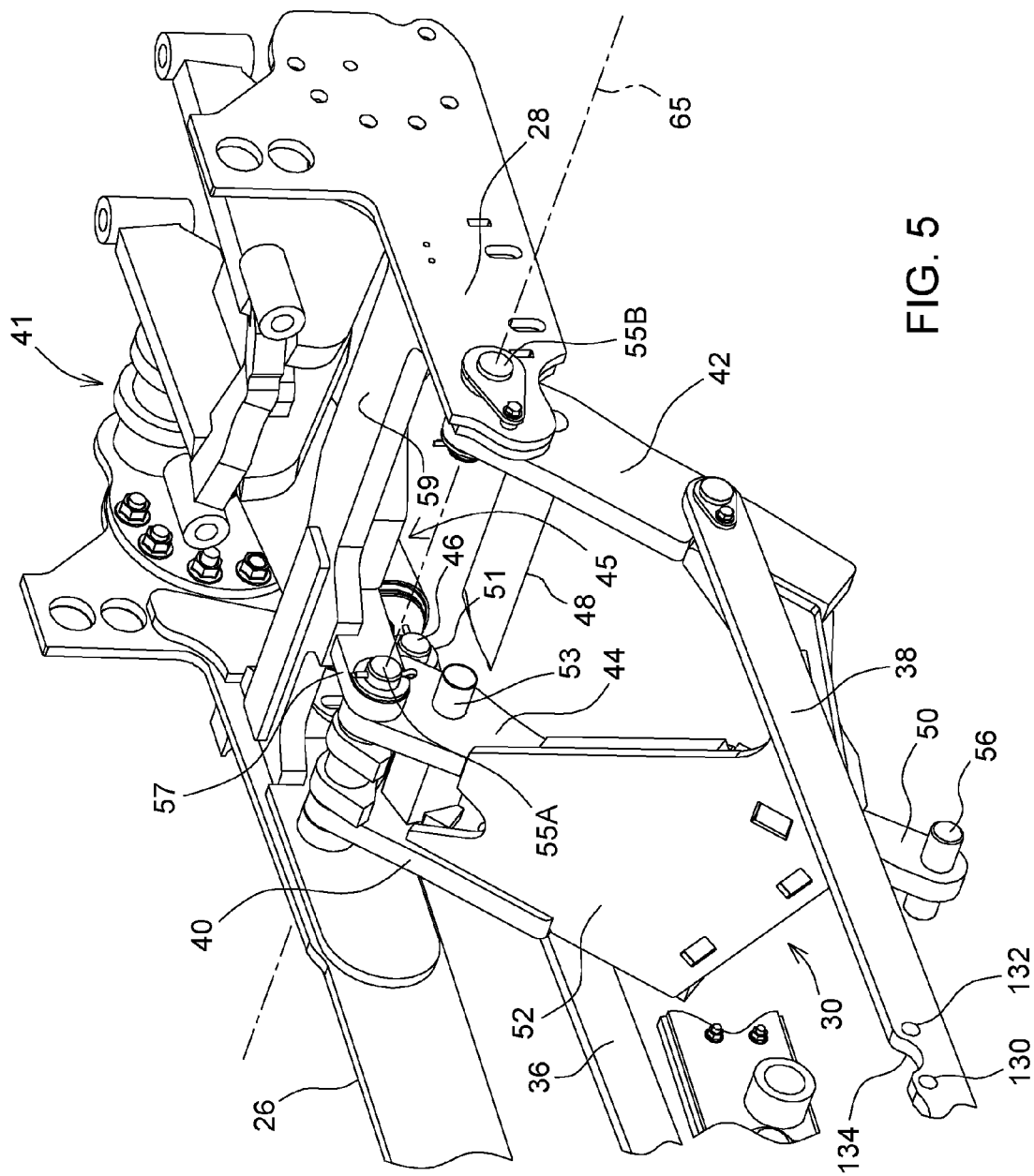
FIG. 5 is an enlarged perspective view of a lift of the first ballast assembly.
Figure 6:
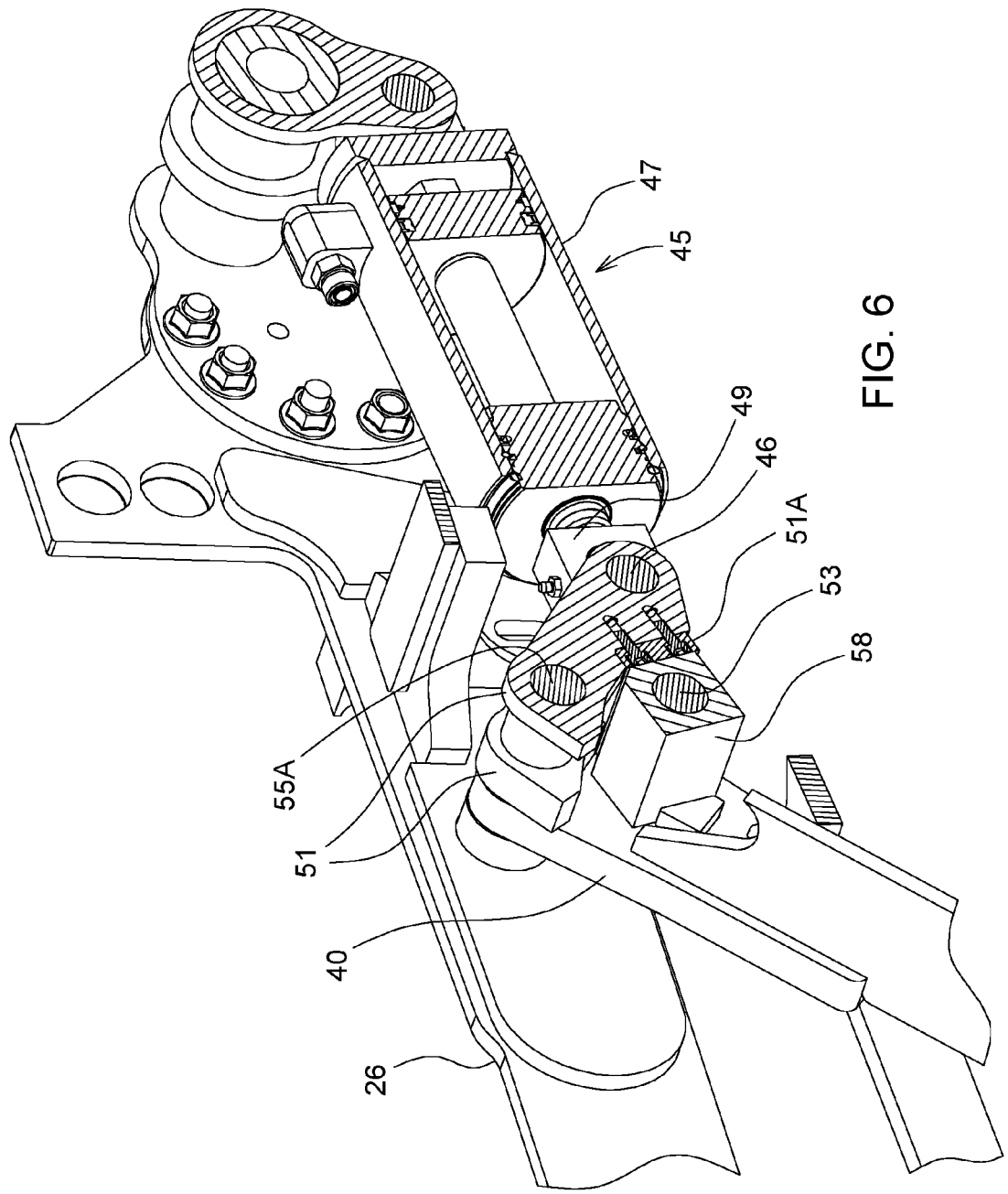
FIG. 6 is a perspective view of a portion of the lift, portions of which are shown in cutaway.
Figure 7:
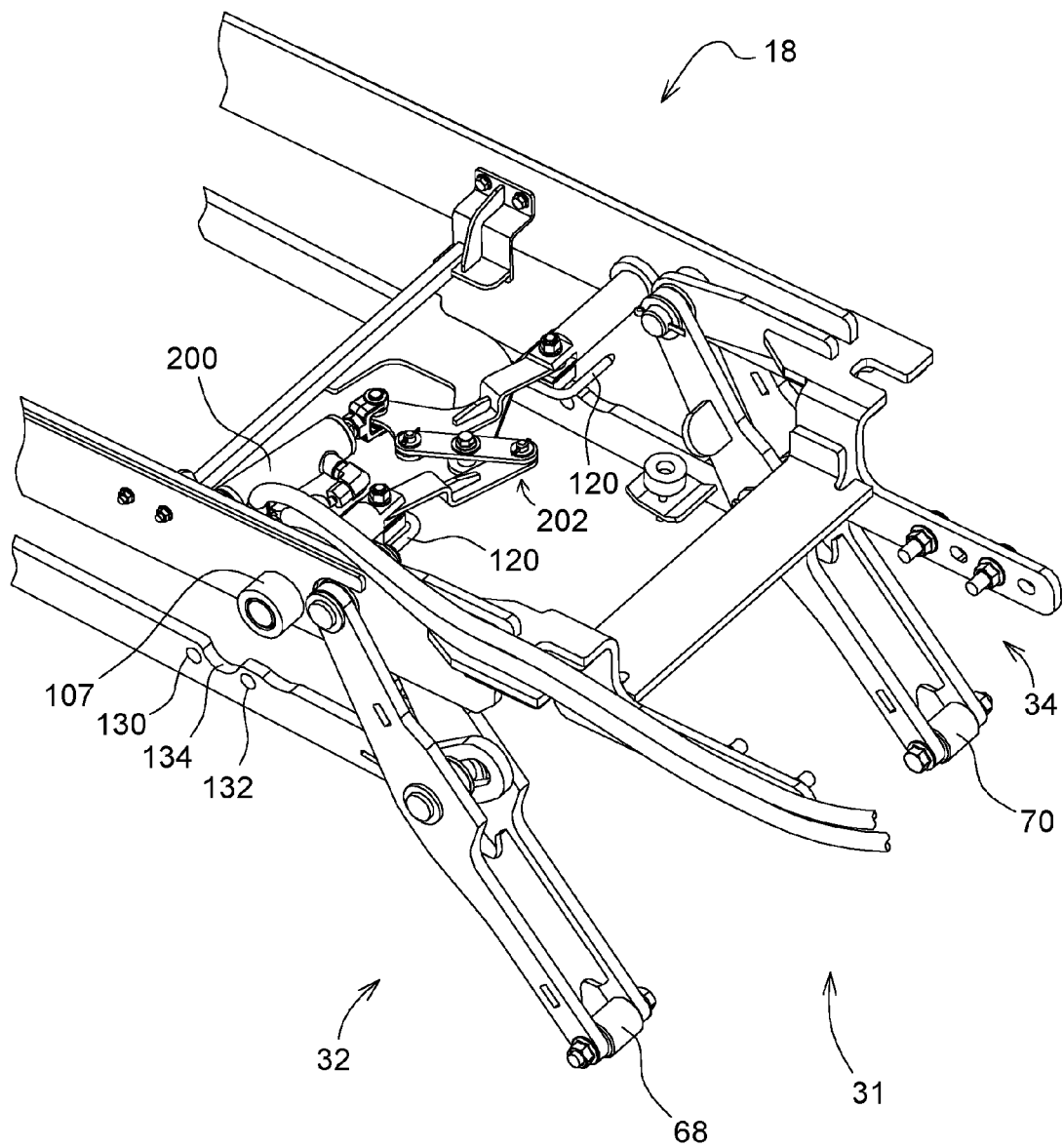
FIG. 7 is a top side perspective view of pivot arms being in a loading position.
Figure 8:
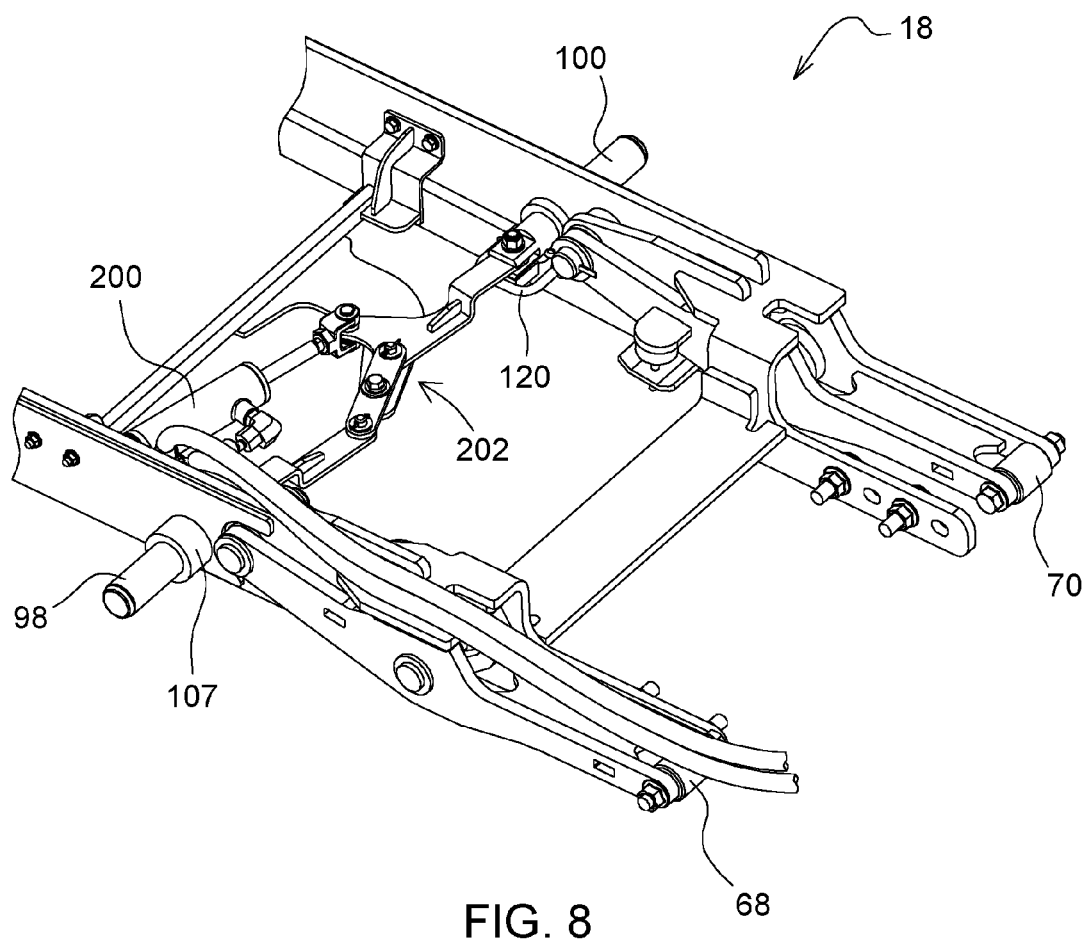
FIG. 8 is a top side perspective view of the pivot arms being in a loaded position.
Figure 9:
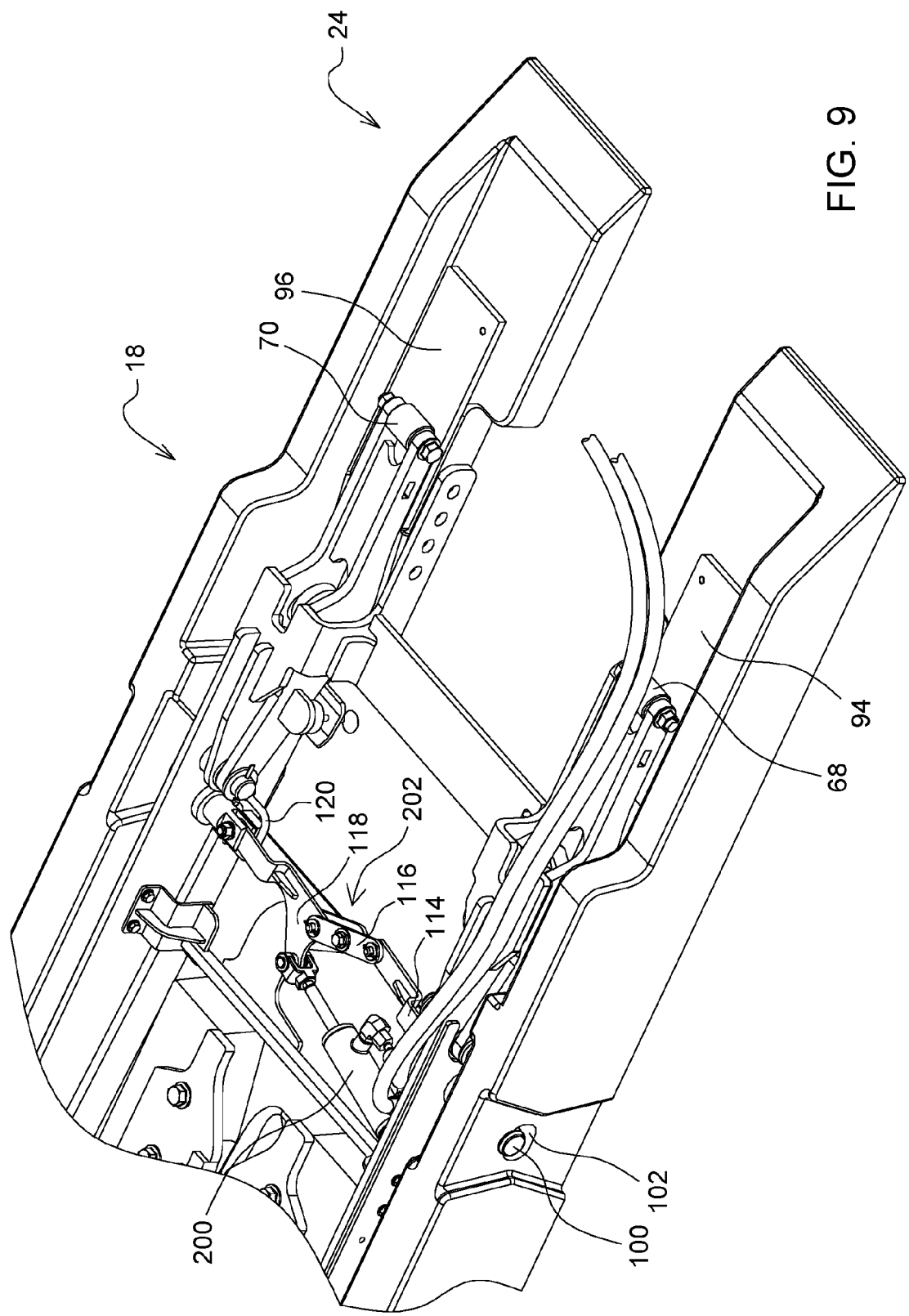
FIG. 9 is a perspective view of a portion of the first ballast assembly in a loaded position.

Referring to FIG. 1, there is shown a work vehicle 10 in the form of an agricultural tractor. The vehicle 10 includes a frame 12 which is supported by ground engaging elements 14, 16. The vehicle 10 is shown with four wheels as the ground engaging elements 14, 16, but other embodiments may include either two tracks (i.e., one on each side of the vehicle 10) or four tracks (i.e., a track in place of each wheel). Further shown in FIG. 1 is a first ballast assembly 18 that includes a frame 20 attached to an underside of the frame 12, a linkage assembly 22, and a ballast weight 24. The ballast assembly 18 may be a part of the chassis of the vehicle 10, or alternatively it may be an add-on assembly to the vehicle 10 (e.g., an aftermarket assembly).

As shown in FIGS. 2-6, the frame 20 includes a left frame member 26 and a right frame member 28. The left and right frame members 26, 28 may be spaced apart, and parallel to each other, relative to a central fore-and-aft axis 35 defined by the ballast assembly 18.

A lift 30 may be pivotally coupled to a forward portion of the left and right frame members 26, 28. The lift 30 may be made as a single forging or, alternatively, as multiple parts joined together with welds or fasteners. A rear pivot unit 31 may be pivotally coupled to a rear portion of the left and right frame members 26, 28. The rear pivot unit 31 may include a left rear pivot arm 32 and a right rear pivot arm 34. The left rear pivot arm 32 may be pivotally coupled to a rear portion of the left frame member 26, while the right rear pivot arm 34 may be pivotally coupled to a rear portion of the right frame member 28.

The lift 30 may include a left pivot arm 40, a right pivot arm 42, an additional arm 44, and a pivot pin 46. The left pivot arm 40 is pivotally coupled to the left frame member 26, and the right pivot arm 42 is pivotally coupled to the right frame member 28. As illustrated, the additional arm 44 may be pivotally coupled to the left frame member 26, and the pivot pin 46 may be positioned between the additional arm 44 and the left pivot arm 40. In other embodiments, the additional arm 44 may be coupled to the right frame member 28, and the pivot pin 46 may extend between the additional arm 44 and the right pivot arm 42.

A coupling pin 53 may extend between the upper ends of the left pivot arm 40 and the additional arm 44. A hollow support rod 48 extends between the left pivot arm 40 and the right pivot arm 42.

The lift 30 may further include a central arm 50 that engages with the weight 24. The left pivot arm 40 has a segment that transitions laterally inwards, and a lower end that is coupled to the central arm 50. Similarly, the right pivot arm 42 also has a segment that transitions laterally inwards, and a lower end that is coupled to the central arm 50.

A left link 36 has a front end that is pivotally coupled to the left pivot arm 40, and has a rear end pivotally coupled to the left rear pivot arm 32. A right link 38 has a front end pivotally coupled to the right pivot arm 42, and has a rear end pivotally coupled to right rear pivot arm 34. The rear pivot arms 32, 34 may be positioned rearward from the lift 30 relative to the central fore-and-aft axis 35.

The first ballast assembly 18 may include an actuator 45 with a rod 49. The actuator 45 may have a first end pivotally coupled to the frame 20 and a second end pivotally coupled to the pivot pin 46, and the actuator 45 may rotate lift 30 upwards and downwards. The rod 49 may be pivotally coupled to a pivot pin 46. A piston housing 47 pivotally coupled to brackets 41. The brackets 41 may be fixed to the front end of the left frame member 26.

The actuator 45 may be positioned in front of the upper end of the lift 30, and the lift 30 may be positioned between the actuator 45 and the rear pivot arms 32, 34. The actuator 45 may be connected to a selective control valve of the vehicle 10, so as to be controllable from the operator station 19 of the vehicle 10. The pivot pin 46 pivotally attaches the rod 49 to the pivot links 51. The coupling pin 53 may be supported by and extend between the left and right pivot arms 40, 42.

The coupling pin 53 supports a push block 58 that is acted upon by a lower portion of the pivot links 51 to raise the lift 30. The upper pin 55A pivotally supports the upper ends of the left and right pivot arms 40, 42 and the pivot links 51. Another upper pin 55B pivotally supports the upper end of the right pivot arm 42. An upper pin 55A may be supported by the left frame member 26, and further by a bracket 57 that may be fixed to cross brace 59. The cross brace 59 may be fixed to both the left and right frame members 26, 28.

The pivot links 51 engage, but are separate from, the push block 58. The pivot links 51 and the lift 30 pivot on an axis 65 defined by the upper pin 55A. The pivot links 51 push against lift 30 via the push block 58. Because the pivot links 51 are not physically attached to push block 58, the pivot links 51 are separable from the push block 58 when the actuator 45 is retracted. This allows the actuator 45 to retract the rod 49 and to separate pivot links 51 forward and away from the lift 30, so as to increase the ground clearance when the weight 24 is not attached. A removable contact plate 51A may be attached to a lower portion of the pivot links 51 and the front side of push block 58.

The lift 30 may also include a central arm 50 that is fixed between the left and right pivot arms 40, 42 by the plates 52, 54. The left and right ends of a coupling pin 56 project laterally away from a lower end of central arm 50, and may form a T-hook or other suitable hook shape. The left rear pivot arm 32 has a pair of spaced apart arm plates 60, 62, and the right rear pivot arm 34 has a pair of spaced apart arm plates 64, 66. A left rear roller 68 may be mounted to the lower end of left rear pivot arm 32, and similarly a right rear roller 70 may be mounted to the lower end of right rear pivot arm 34.

The weight 24 may include a main body 80; left and right rails 82, 84; a front left wing 86; a front right wing 88; a left rear leg 85; and a right rear leg 87. The weight 24 may also include left and right hook members 90, 92 that are mounted on an upper surface of the main body 80, forward of a center of gravity of the weight 24. The left and right hook members 90, 92 releasably receive the coupling pin 56. A left coupler pad 94 may be mounted on an upper surface of the left rear leg 85 rearward of the left and right hook members 90, 92. And similarly, a right coupler pad 96 may be mounted on an upper surface of the right rear leg 87 rearward of the left and right hook members 90, 92. The left and right coupler pads 94, 96 may cast into the weight 24.

The weight 24 may include left and right guide blocks 91 and 93 that are spaced adjacent, rearward, and outward of the left and right hook members 90, 92. The guide surfaces 95, 97 may be formed on the left and right guide blocks 91, 93, respectively. The forward ends of the guide surfaces 95, 97 are closer together than their rearward ends, so as to form a loading slot 99. As a result, the guide surfaces 95, 97 help guide the coupling pin 56 into and through the loading slot 99, and also into engagement with the hook members 90, 92. The guide surfaces 95, 97 allow for easy engagement, even when the weight 24 is not aligned exactly with the vehicle 10.

The weight 24 may include ramped surfaces 150, 152, 154, and 156 that are positioned on the wings 86, 88, respectively. The ramped surfaces 150 and 154 guide the ground engaging elements 14, 16 over the wings 86, 88 in the forward direction. And alternatively, the ramped surfaces 152 and 156 guide them over the wings 86, 88 in the rearward direction. The lateral width 162 of main body 80 is less than lateral width 164 of the wings 86, 88.

The weight 24 also includes openings and is shaped to fit or mate with the vehicle 10, so as to reduce any impact on ground clearance. For example, the cavities 158, 160 are formed in the wings 86, 88, and may be sized and shaped in a manner complementary to the underside of the vehicle 10. The cavities 158, 160 may also aid in aligning the weight 24 with the vehicle 10.

The size and mass of the weight 24 may be varied and shifted in position to change the weight split placed on each axle of the vehicle 10, or to change the center of gravity of the vehicle 10. The weight 24 may be positioned to provide an even weight split to the front and rear axles of the vehicle 10, or alternatively to provide an uneven weight split to the front and rear axles (e.g., 65% on the rear axle and 35% on the front axle).

The mass of weight 24 may be stamped or cast into the surface thereof, so that the operator can determine its size from a distance, such as from the operator station 19. Alternate marking schemes (e.g., paint schemes or visible features) or remote sensing hardware (e.g., RFID) may also be used to help the operator determine the mass from a distance. Some embodiments of the ballast assembly 18 may include a remote camera or sensor for aiding in the loading of the weight 24.

The left coupler pad 94 engages the left rear roller 68, and the right coupler pad 96 engages right rear roller 70. The hook members 90, 92 may be positioned rearward of the center of gravity of the weight 24, and further they may be positioned between the left and right coupler pads 94, 96. The fore end 326 of the weight 24 will be pulled down by gravity about an axis defined by the coupling pin 56. In contrast, the aft end 328 of weight 24 will be pulled upwardly, and the left and right coupler pads 94, 96 will be pressed upwardly against the rear rollers 68, 70 when the weight 24 is hanging on the coupling pin 56.

When the actuator 45 is retracted, the rear pivot arms 32, 34 pivot counter-clockwise about their upper ends, and the weight 24 swings upward and rearward. Because the actuator 45 is forward of the lift 30, the actuator 45 will be spaced apart forwardly of the weight 24, so as to not interfere with its upward movement.

With the weight 24 setting on a ground surface 17, the rear pivot arms 32, 34 are lowered with the actuator 45. The operator then lines up the vehicle 10 with the center of the weight 24, and drives it forward and over the weight 24. The wings 86, 88 provide the operator with feedback, so that he can gauge the alignment of the vehicle 10 with the weight 24. Once contact is made between the lift 30 and the weight 24, the vehicle 10 then drags and aligns the weight 24.

Next, the coupling pin 56 of the T-hook slides through the loading slot 99 and into the hook members 90, 92. The operator then commands the actuator 45 to raise the weight 24. The operator may then secure the weight 24 into place with a cable actuated set of locking pins 98, 100. The weight 24 includes locking pin openings 102, 104 that are formed through the left and right rails 82, 84, respectively. The locking pins 98, 100 are part of a locking assembly 202 that is coupled to, and between, the left and right frame members 26, 28.

An actuating lever 108 may be connected to a push/pull cable 110 that is connected to the locking assembly 202. The actuating lever 108 moves a wire in the push/pull cable 110. Movement of the push/pull cable 110, in a first direction, causes the locking assembly 202 to pull the locking pins 98, 100 inward, so as to disengage them from the locking pin openings 102, 104. And in contrast, movement of the push/pull cable 110, in a second direction, pushes the locking pins 98, 100 outward, so as to engage them with the locking pin openings 102, 104. In other embodiments of the ballast assembly 18, the operator may secure the weight 24 from the operator station 19 via hydraulically or electrically controlled actuators.

The locking assembly 202 may include collars 107 in both the left and right frame members 26, 28, within which the locking pins 98, 100 are positioned for inward and outward movement, and for enhancing the support of the weight 24. The left and right links 36, 38 each have orifices 130, 132 and a cutout portion 134. The cutout portion 134 allows for the left and right links 36, 38 to be raised into position without interfering with the locking pins 98, 100.

Included in the locking assembly 202 are forks 120 for engaging with the orifices 130, 132. Specifically, the forks 120 extend through the orifices 130, 132 to lock the first ballast assembly 18 when the weight 24 is not loaded. And in contrast, the forks 120 retract out of the orifices 130, 132 when it is desired to lower the first ballast assembly 18.

Referring to FIGS. 7-10, a locking actuator 200 and locking assembly 202 are used to actuate the locking pins 98, 100 and the forks 120. The locking actuator 200 may be actuated either hydraulically or electrically. The locking assembly 202 may include linkages 114, 116, 118. Use of the locking actuator 200 may allow the operator to be in the vehicle 10 during the loading and unloading of an alternate weight 224. The hydraulic circuit and control methodology may include one hydraulic control valve (e.g., one selectable control valve) for controlling the locking actuator 200.

Figure 10:
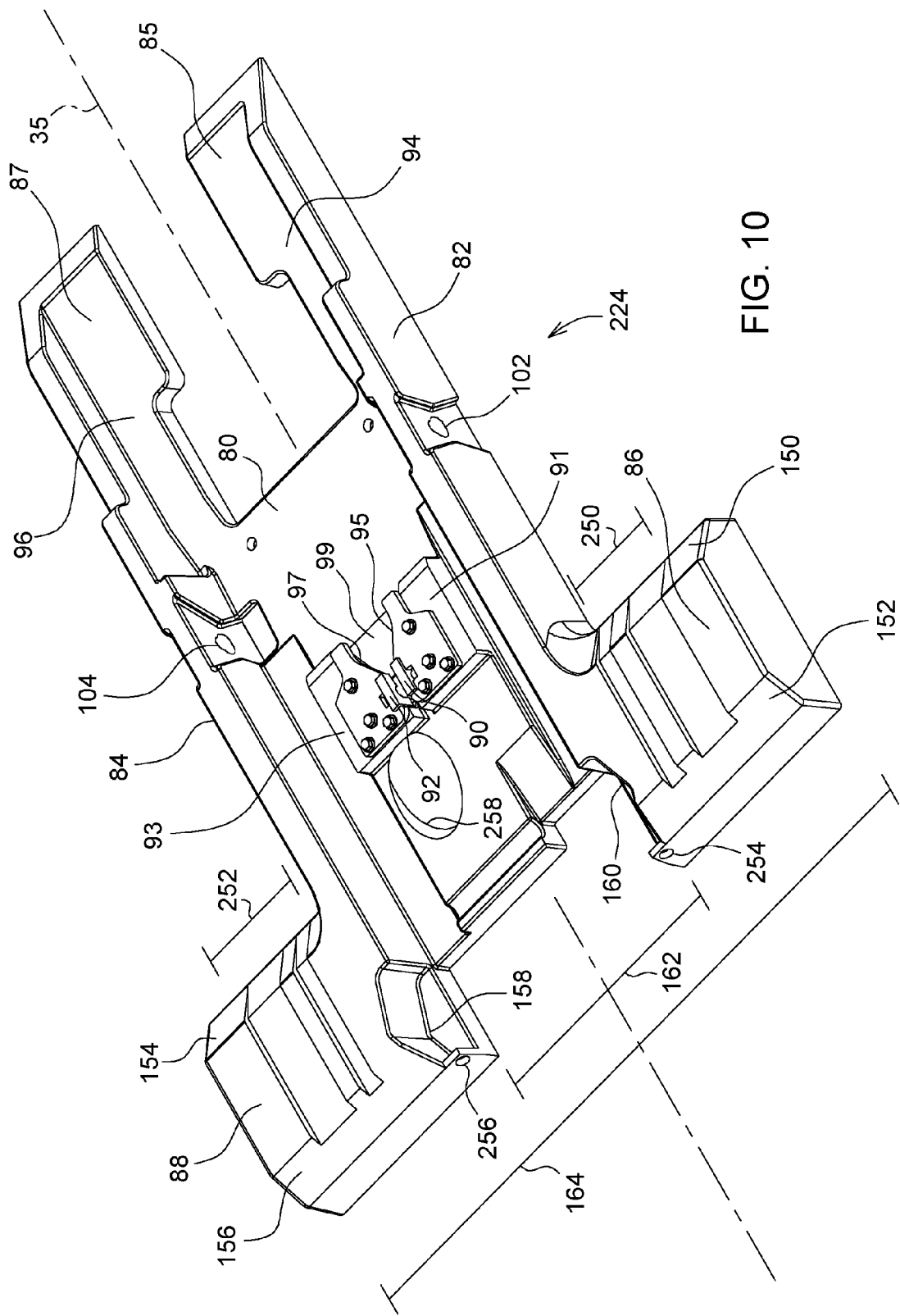
FIG. 10 is a perspective view of another embodiment of the ballast weight.

As shown in FIG. 10, the weight 224 may include ribbing features 250, 252 on the wings 86, 88. The ribbing features 250 and 252 may help in aligning the tires when the vehicle 10 is driven in position to load the weight 224. Further, the weight 224 may include chain holes 254 and 256 that allow for the weight 224 to be picked up and moved. Still further, the weight 224 may include an orifice 258 to allow for radar signals from a radar system (not shown) of the vehicle 10 to reach the ground.

When the weight 224 is no longer required, the operator can release the locking pins 98, 100 via lever 108, lower the weight 224 on to a ground surface 17, and disconnect it by backing up the vehicle 10. In some embodiments, when in the loaded position, the frame 20 and the linkage assembly 22 extend no lower to the ground than the lowest feature on the underside of the vehicle 10. After the lift 30 has been raised without the weight 224, the locking pins 100 are engaged to hold the ballast assembly 18 in this raised position. The actuator 45 may be retracted to tuck it and the separate pivot links 51 up above the frame 20.

Referring to FIGS. 11-19, a second embodiment of a ballast assembly 318 is shown. In the second ballast assembly 318, the lift 30 has an upper end pivotally coupled to the frame 20 and a lower end releasably coupled to a weight 324.

Figure 11:
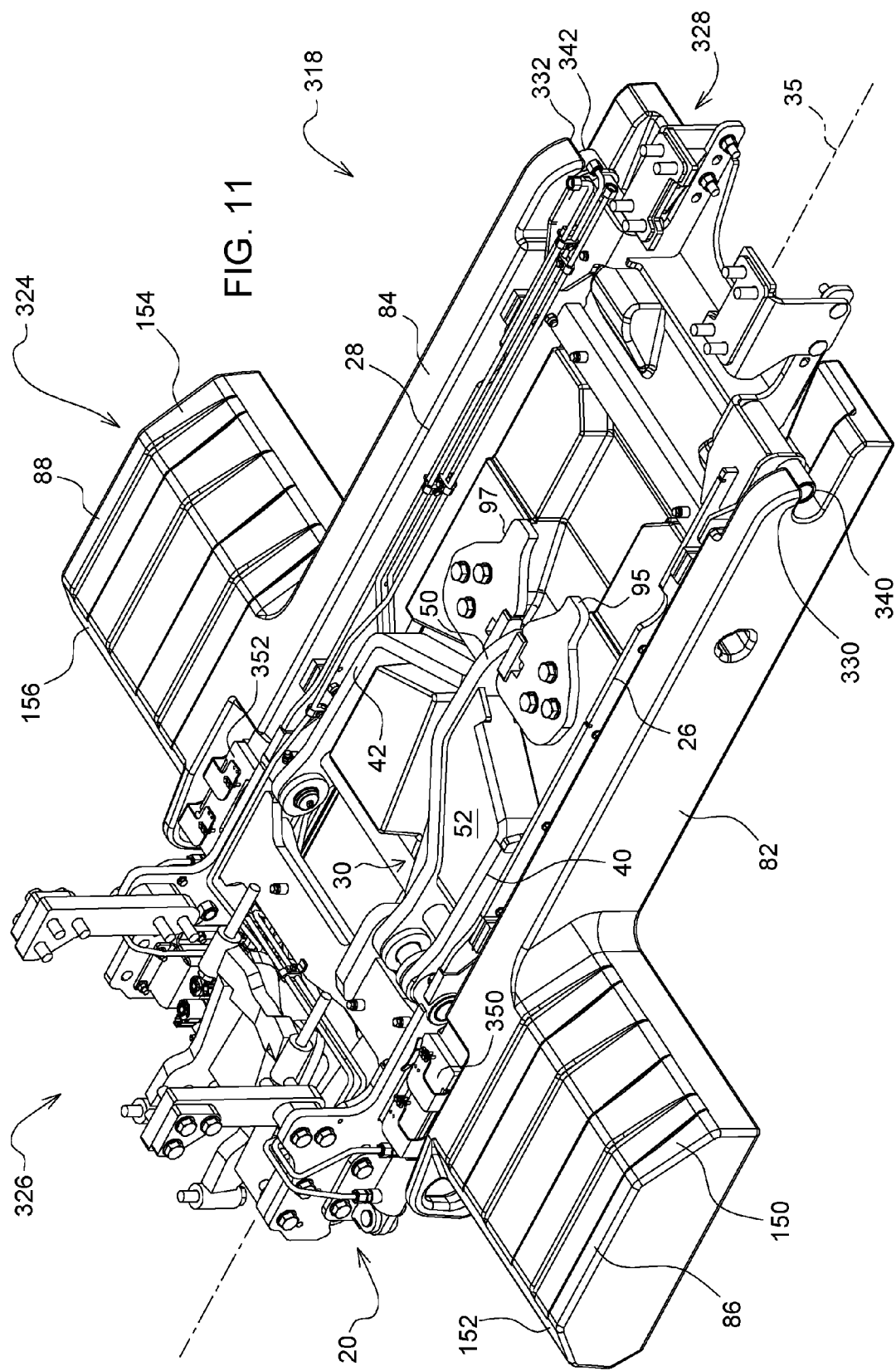
FIG. 11 is a perspective view of a second embodiment of a ballast assembly in a loaded position.
Figure 12:
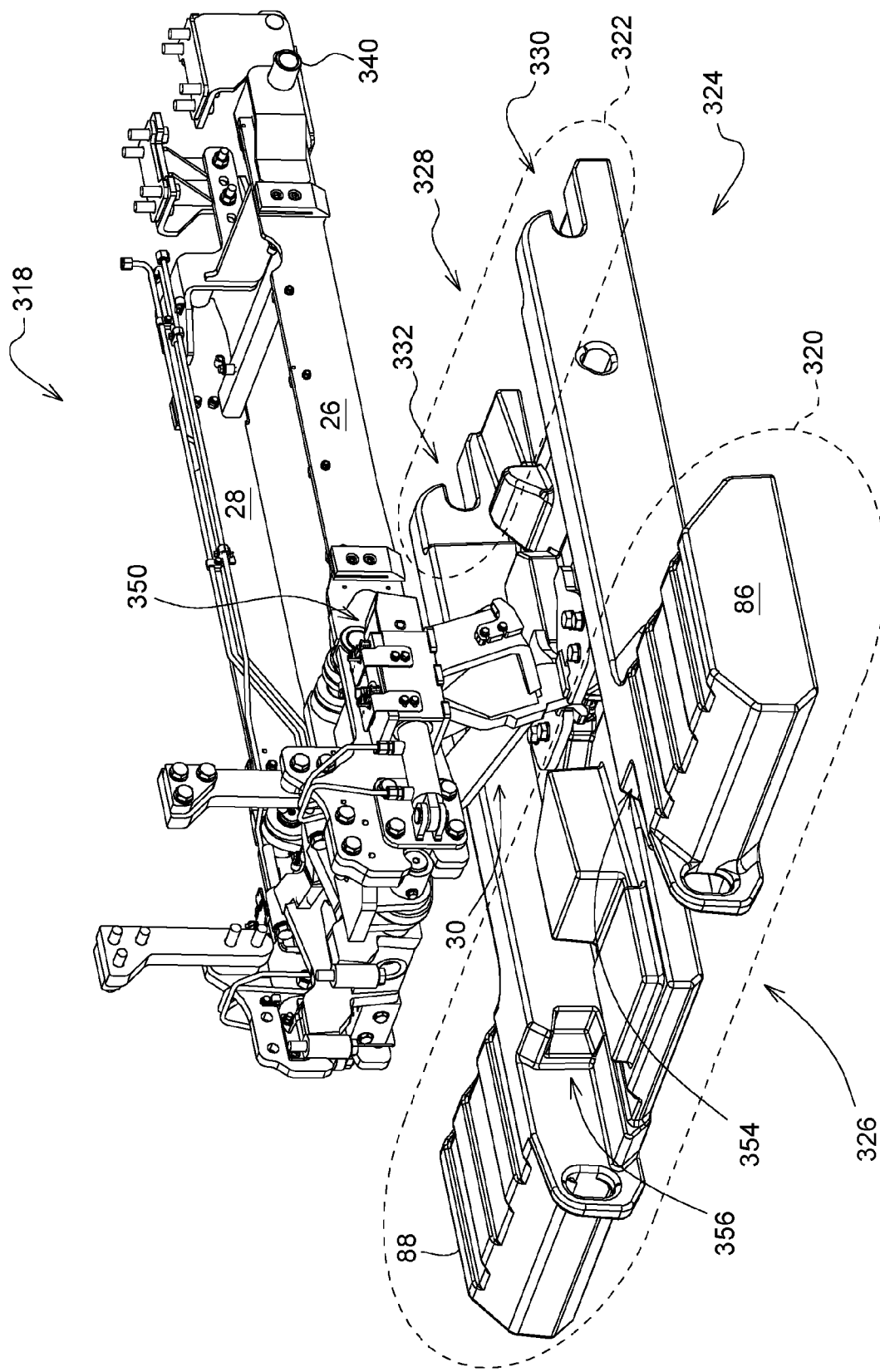
FIG. 12 is a left side perspective view of the second ballast assembly in a loading position.
Figure 13:
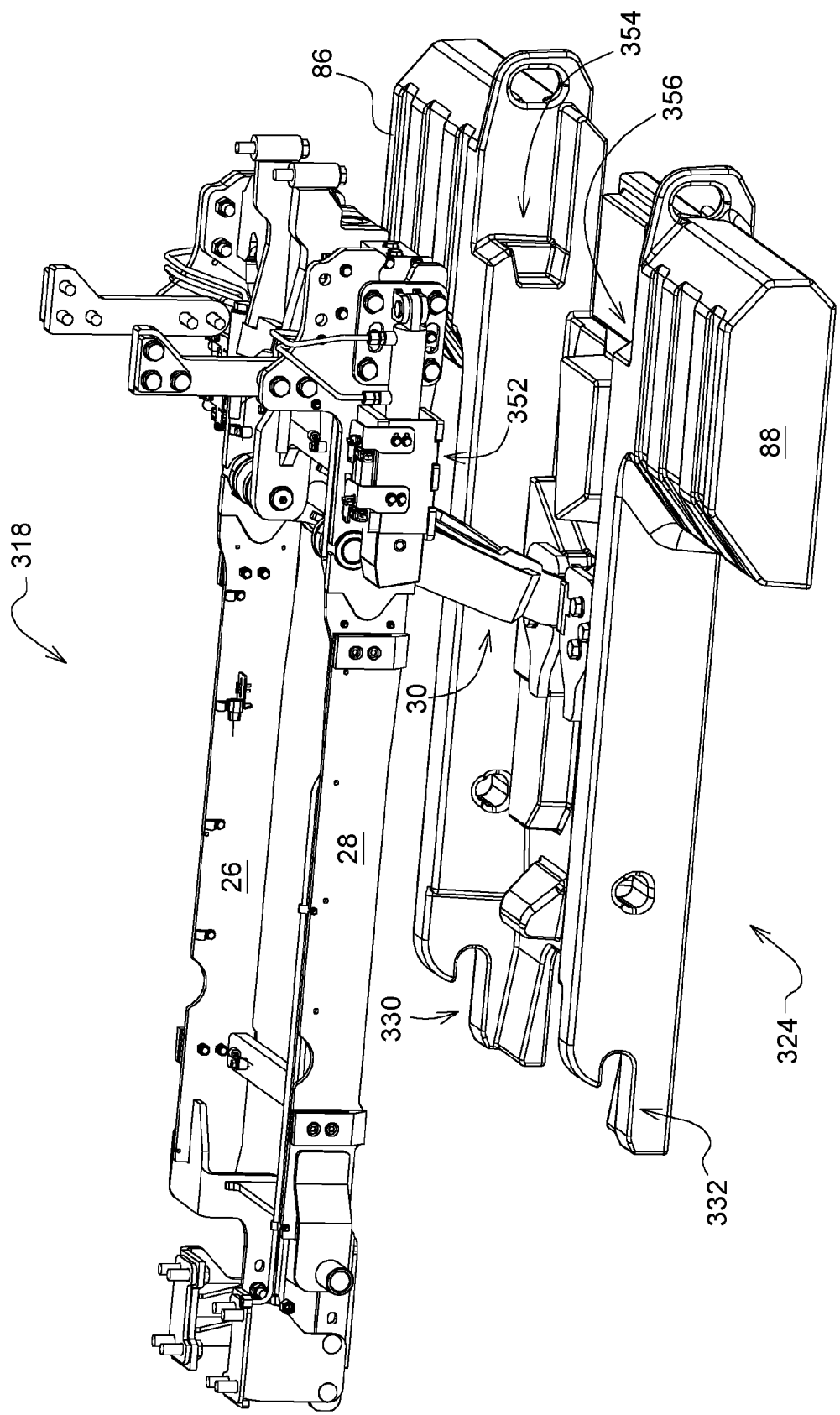
FIG. 13 is a right side perspective view of the second ballast assembly in a loading position.

As shown in FIGS. 11-13, the second ballast assembly 318 may include an actuator 45 having a first end pivotally coupled to the frame 20 and a second end pivotally coupled to the lift 30. The actuator 45 may rotate the lift 30 upwards when the weight 324 is being loaded onto the vehicle 10, and downwards when it is being unloaded. Exemplarily, the weight 324 includes a loading slot 99 that engages with the central arm 50. As illustrated, the loading slot 99 is rearward facing and is positioned along the central fore-and-aft axis 35. In other embodiments, the loading slot 99 may be forward facing and may even be offset from the central fore-and-aft axis 35.

The weight 324 may include a first forward facing engagement slot 354 and a second forward facing engagement slot 356. The first forward facing engagement slot 354 may be positioned at a fore end 326, and on a left side, of the main body 80. And alternatively, the second forward facing engagement slot 356 may be positioned at a fore end 326, and on a left side, of the main body 80. Some embodiments of the weight 324 may only include a single forward facing engagement slot that is, for example, aligned with the central fore-and-aft axis 35.

Each of the forward facing engagement slots 354, 356 may include a forward bottom surface 344, a forward top surface 346, and a forward facing connecting surface 348 that connects the forward bottom surface 344 and the forward top surface 346. The forward bottom surface 344 extends farther forward than the forward top surface 346. This allows the forward bottom surface 344 to engage with the frame 20 when the weight 324 is loaded onto the vehicle 10.

The wings 86, 88 may extend laterally outward from the first and second forward facing engagement slots 354, 356. And as shown, the wings 86, 88 may overlap the first and second forward facing engagement slots 354, 356 along the central fore-and-aft axis 35.

The frame 20 may include a first actuator 350 mounted to the left frame member 26, and a second actuator 352 mounted to the right frame member 28. Exemplarily, the first and second actuators 350, 352 may extend and retract in a direction that is parallel to the central fore-and-aft axis 35, and they may be hydraulically actuated. Some embodiments of the second ballast assembly 318 may include a single actuator, such as when there is a single forward facing engagement slot.

When the weight 324 is being loaded onto the vehicle 10, the first and second actuators 350, 352 slide into the first and second forward facing engagement slots 354, 356, respectively. And further, when the weight 324 is being unloaded from the vehicle 10, the first and second actuators 350, 352 slide out of the first and second forward facing engagement slots 354, 356, respectively. The first and second actuators 350, 352 may be hydraulic actuators that are extended and retracted by the operator of the vehicle 10.

The weight 324 may further include a first rearward facing engagement slot 330 positioned at an aft end 328, and on a left side of the main body 80. And additionally, the weight 324 may include a second rearward facing engagement slot 332 positioned at the aft end 328, and on a right side, of the main body 80. Some embodiments of the weight 324 may only include a single rearward facing engagement slot that is, for example, aligned with the central fore-and-aft axis 35.

Each of the rearward facing engagement slots 330, 332 may include a bottom surface 334, a top surface 336, and a rearward facing connecting surface 338 that connects the bottom surface 334 and the top surface 336. The bottom surface 334 extends farther rearward than the top surface 336, and the bottom surface 334 is the second portion 322 that engages with, and slides along, the frame 20 when the weight 324 is being loaded onto the vehicle 10. In such an embodiment, the rearward facing engagement slots 330, 332 may be "J-shaped."

The frame 20 may include first and second engagement posts 340, 342. The first engagement post 340 may extend laterally outward from the left frame member 26 and perpendicularly from the central fore-and-aft axis 35, while the second engagement post 342 may extend laterally outward from the right frame member 28 and perpendicularly from the central fore-and-aft axis 35. Other embodiments of the second ballast assembly 318 may include just a single engagement post positioned laterally in between the left and right frame members 26, 28, such as when there is just a single rearward facing engagement slot.

When the weight 324 is being loaded onto the vehicle 10, the first and second engagement posts 340, 342 may slide into the first and second rearward facing engagement slots 330, 332, respectively. And alternatively, when the weight 324 is being unloaded from the vehicle 10, the first and second engagement posts 340, 342 slide out of the first and second rearward facing engagement slots 330, 332, respectively.

The weight 324 has a first portion 320 and a second portion 322. The first portion 320 may positioned at one of the fore end 326 and the aft end 328 of the weight 324, while the second portion 322 may be positioned at the other of the fore end 326 and the aft end 328 of the weight 324. In the illustrated embodiment, the first portion 320 is positioned at the fore end 326, and the second portion 322 is positioned at the aft end 328.

Figure 14:
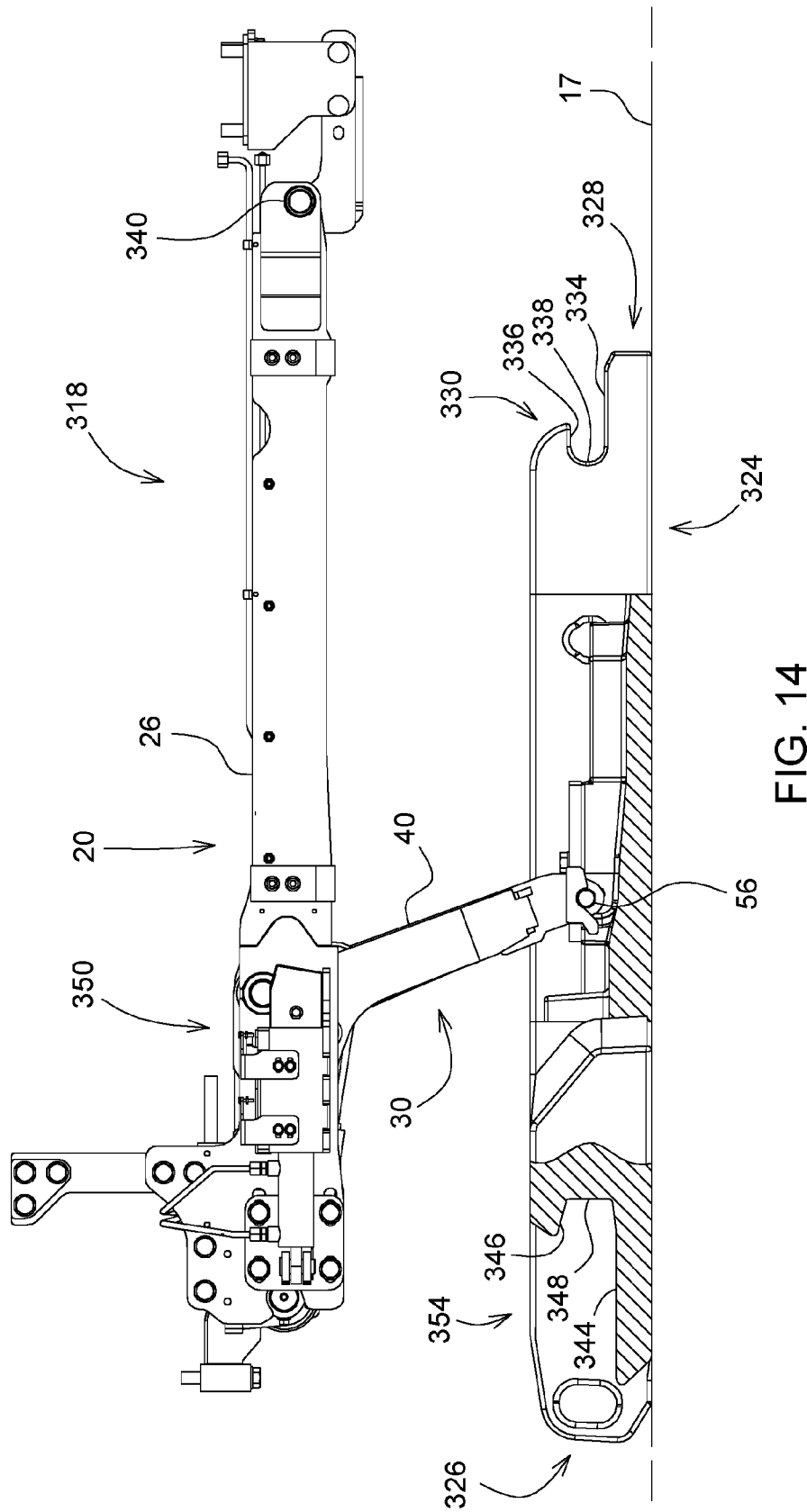
FIG. 14 is a partially cutaway side view of the second ballast assembly in a loading position, in which the ballast weight is on a ground surface.
Figure 15:
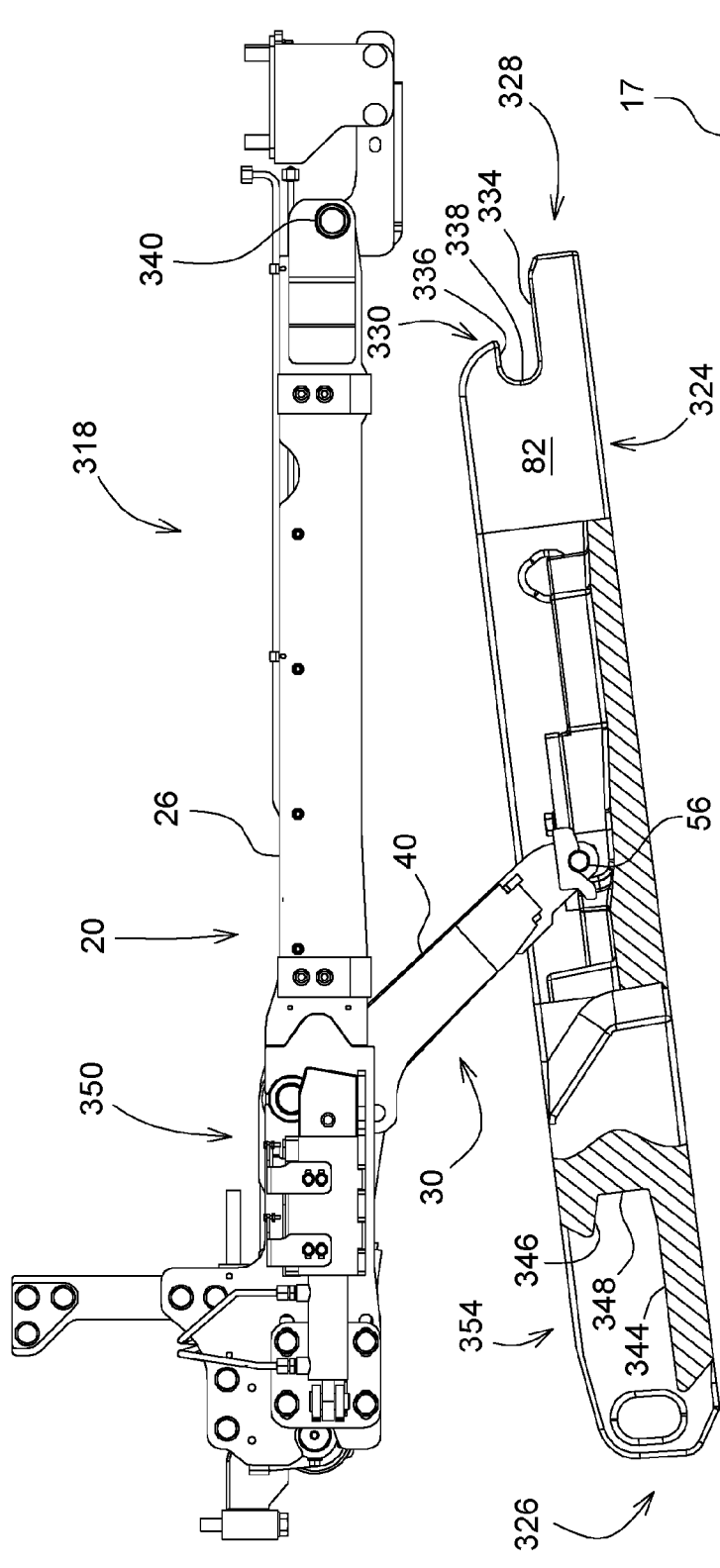
FIG. 15 is a partially cutaway side view of the second ballast assembly in a loading position, in which the ballast weight is slightly raised.

As shown in FIG. 14, the second ballast assembly 318 is in a loading position, in which the lift 30 is engaged with the weight 324, and the bottom surface of the weight 324 is engaged with the ground surface 17. Next, as shown in FIG. 15, the second ballast assembly 318 is in a loading position, in which the weight 324 is slightly raised and only the first portion 320 engages with the ground surface 17. The weight 324 may raise in this manner based on an offset center of gravity and on engagement point with the lower end of the lift 30. In the illustrated example, the weight 324 includes wings 86, 88 that extend laterally outward from the fore end 326 of the main body 80, causing the weight 324 to tilt as it is lifted.

Figure 16:
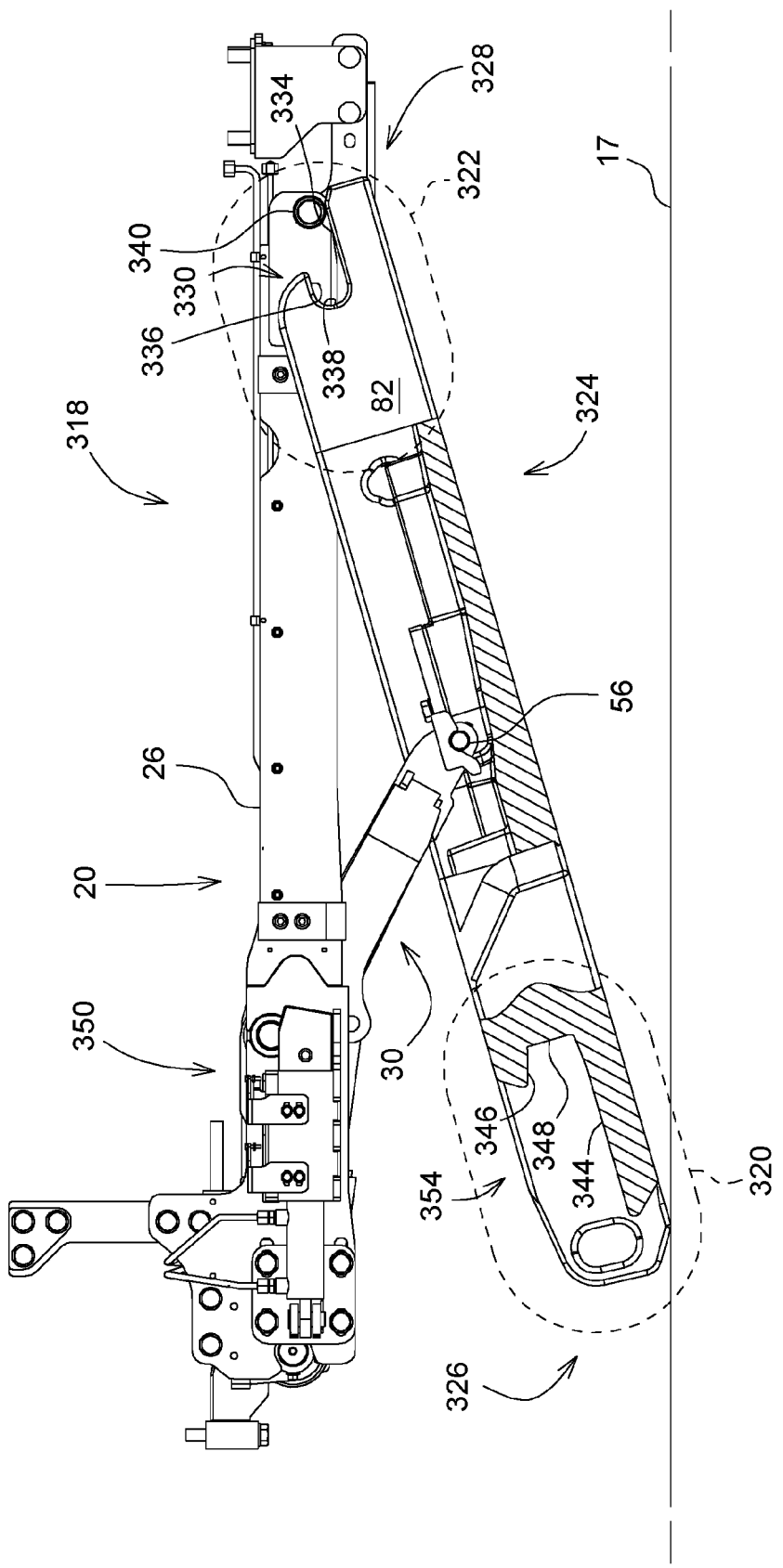
FIG. 16 is a partially cutaway side view of the second ballast assembly in a loading position, in which the ballast weight is engaging with the frame.

As shown in FIG. 16, the second ballast assembly 318 is in a loading position, in which the first portion 320 of the weight 324 still engages with the ground surface 17 and the second portion 322 engages with the frame 20. This occurs as the lift 30 rotates upwards, leaving the first portion 320 on the ground surface 17 and causing the second portion 322 to rotate upwards until it engages the frame 20. Again, the weight 324 may raise in this manner based on an offset center of gravity and on its engagement point with the lower end of the lift 30. The second portion 322 engages with the frame 20. In the illustrated embodiment of the second ballast assembly 318, the first and second engagement posts 340, 342 engage with the first and second rearward facing engagement slots 330, 332, and slide relative thereto.

Figure 17:
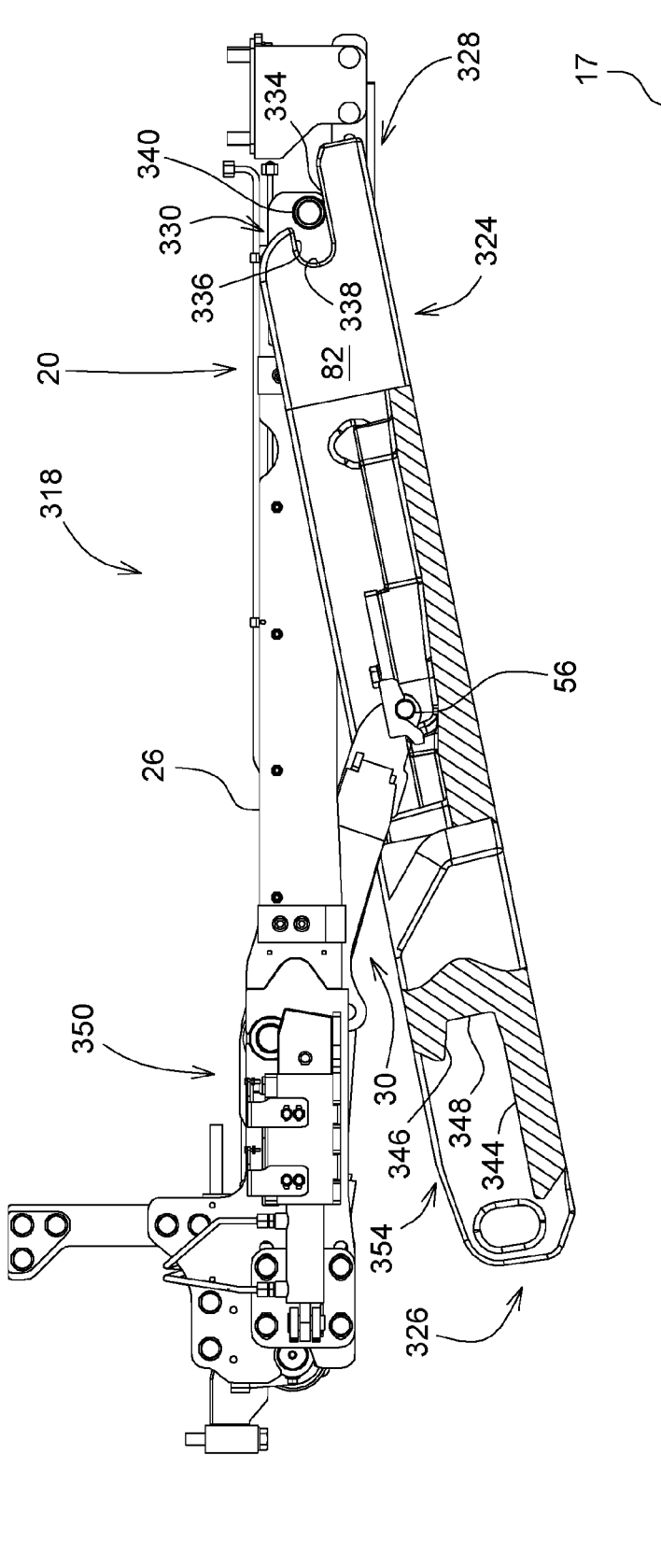
FIG. 17 is a partially cutaway side view of the second ballast assembly in a loading position, in which the ballast weight is completely off of the ground surface.

As shown in FIG. 17, the second ballast assembly 318 is in a loading position, in which the weight 324 is completely off of the ground surface 17. In this position, the first portion 320 is spaced apart from both the ground surface 17 and the frame 20, while the second portion 322 is spaced apart from the ground surface 17 but engagement with the frame 20. In this position, the first and second engagement posts 340, 342 continue to engage with the first and second rearward facing engagement slots 330, 332, and continue to slide relative thereto.

Figure 18:
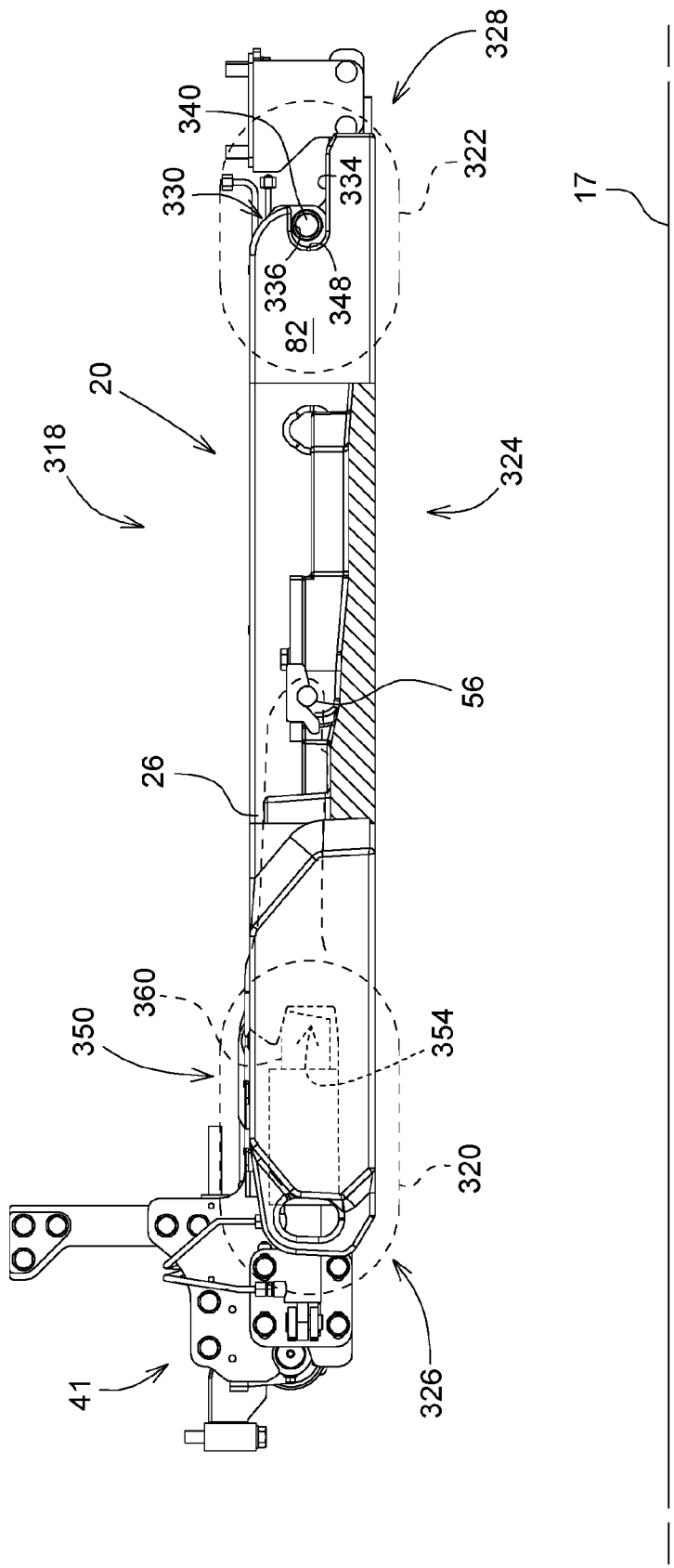
FIG. 18 is a partially cutaway side view of the second ballast assembly in a fully loaded position.

As shown in FIG. 18, when the weight 324 is loaded onto the vehicle 10, both the first and second portions 320, 322 engage with the frame 20. For example, the first portion 320 may engage with the first actuator 350, while the second portion 322 may engage with the first engagement post 340. More specifically, the first and second actuators 350, 352 may be in contact with the first and second forward facing engagement slots 354, 356, and the first and second engagement posts 340, 342 may be in the first and second rearward facing engagement slots 330, 332.

Figure 19:
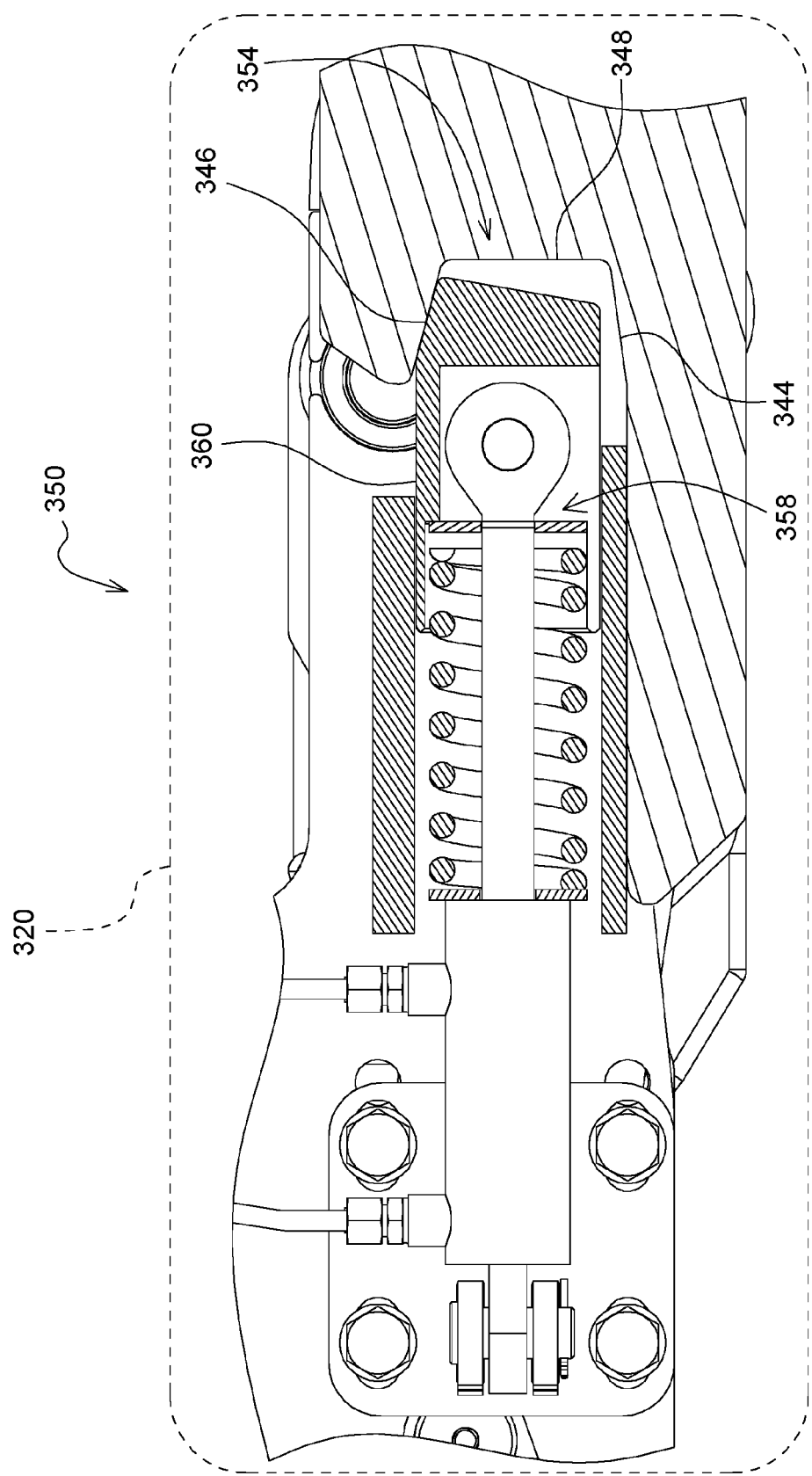
FIG. 19 is an enlarged partially cutaway side view of a locking system when the second ballast assembly is in the fully loaded position.

As shown in FIG. 19, the first actuator 350 may include a rod 358 and an engagement member 360 positioned on the end thereof, so as to slide into and out of the first forward facing engagement slot 354. The weight 324 is in a fully loaded position when the lift 30 is in the fully raised position, the first and second actuators 350, 352 are in the first and second forward facing engagement slots 354, 356, and the first and second engagement posts 340, 342 are in the first and second rearward facing engagement slots 330, 332. When in the fully loaded position, the operator of the vehicle 10 may begin work operations that require the additional ballast provided by weight 324. After such operations are complete, the weight 324 may be unloaded by reversing the operations illustrated in FIGS. 14-18.

Figure 20:
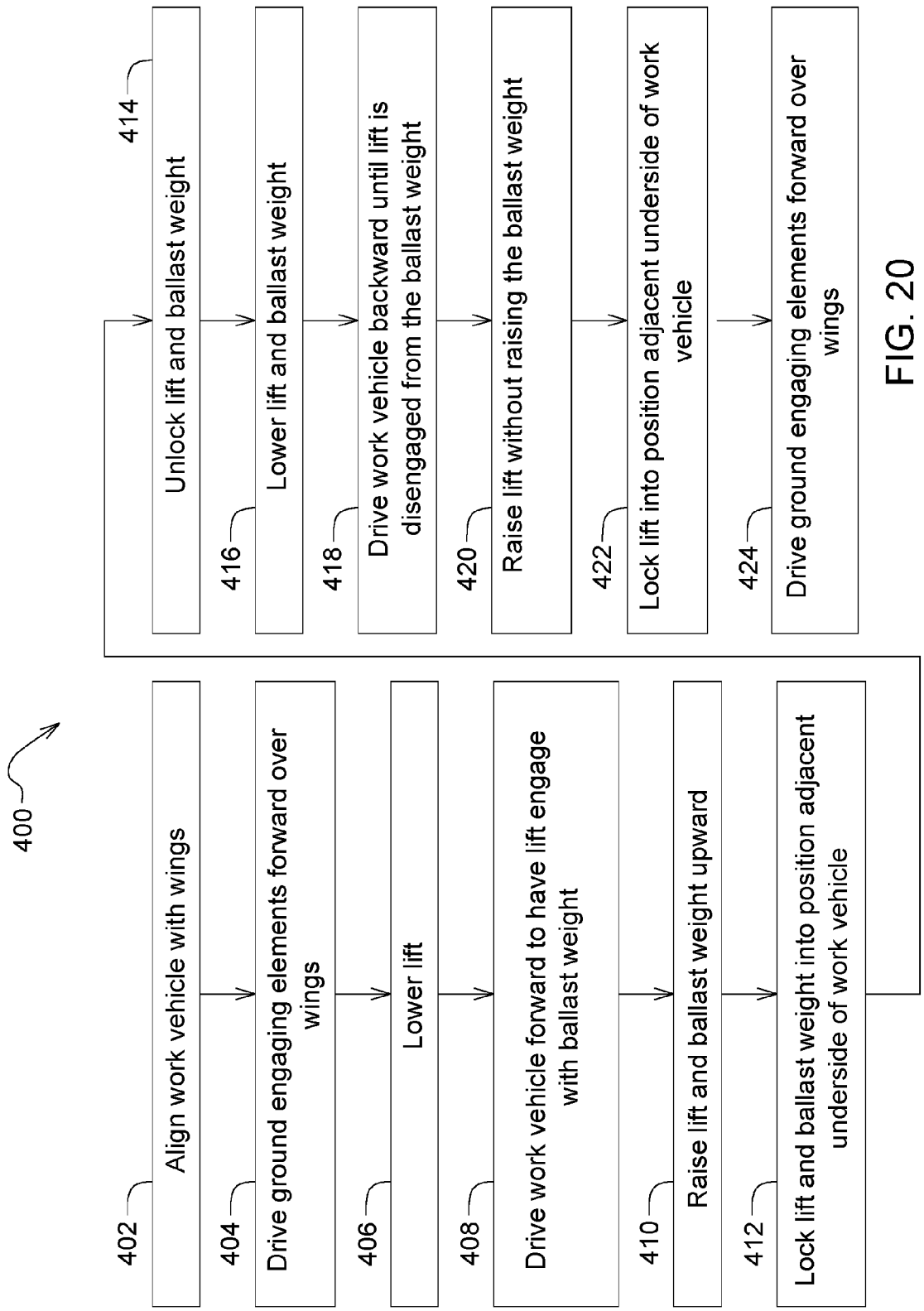
FIG. 20 is flow chart of a method for using the ballast assemblies.

Referring to FIG. 20, there is shown a method 400 for engaging and disengaging the weight 324. Act 402 is to align the vehicle 10 with the wings 86, 88. Act 404 is to drive the ground engaging elements 14 of the vehicle 10 forward and over the wings 86, 88. Act 406 is to lower the lift 30.

Act 408 is to drive the vehicle 10 forward, so that the lift 30 engages with the weight 324. Act 410 is to raise the lift 30 and the weight 324 upward. Act 412 is to lock the lift 30 and the weight 324 into the position adjacent to the underside of the vehicle 10.

Act 414 is to unlock the lift 30 and the weight 324. Act 416 is to lower the lift 30 and the weight 324. Act 418 is to drive the vehicle 10 backward until the lift 30 is disengaged from the weight 324. Act 420 is to raise the lift 30 without raising the weight 324. Act 422 is to lock the lift 30 into position adjacent to the underside of the vehicle 10. Act 424 is to drive the ground engaging elements 14, 16 forward and over the wings 86, 88.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A ballast assembly for a work vehicle, comprising:
   a frame configured to be included in an underside of the work vehicle;
   a ballast weight having a first portion, a second portion, a main body, a first forward facing engagement slot position at a fore end and on a left side of the main body, and a second forward facing engagement slot positioned at the fore end and on a right side of the main body; and
   a lift having an upper end pivotally coupled to the frame and a lower end releasably coupled to the ballast weight, the first and second portions configured to engage with a ground surface and the frame, respectively, when the ballast weight is being loaded onto the work vehicle, and the first and second portions configured to engage with the frame when the ballast weight is loaded onto the work vehicle.

2. The ballast assembly of claim 1, further comprising a plurality of wings extending laterally outward from the fore end of the main body and extending laterally outward from the first and second forward facing engagement slots, the plurality of wings overlapping the first and second forward facing engagement slots along a central fore-and-aft axis defined by the ballast assembly.

3. The ballast assembly of claim 1, wherein the frame comprises a first actuator and a second actuator, the first and second actuators are configured to slide into the first and second forward facing engagement slots, respectively, when the ballast weight is being loaded onto the work vehicle, and the first and second actuators are configured to slide out of the first and second forward facing engagement slots, respectively, when the ballast weight is being unloaded from the work vehicle.

4. The ballast assembly of claim 3, wherein:
   the frame comprises a left frame member and a right frame member spaced apart therefrom relative to a central fore-and-aft axis defined by the ballast assembly
   the first actuator is mounted to the left frame member, the first actuator is configured to extend and retract in a direction that is parallel to the central fore-and-aft axis; and
   the second actuator is mounted to the right frame member, the second actuator is configured to extend and retract in the direction that is parallel to the central fore-and-aft axis.

5. A ballast assembly for a work vehicle, comprising:
   a frame configured to be included in an underside of the work vehicle;
   a ballast weight having a first portion, a second portion, a main body, a first rearward facing engagement slot positioned at an aft end and on a left side of the main body, and a second rearward facing engagement slot positioned at the aft end and on a right side of the main body; and
   a lift having an upper end pivotally coupled to the frame and a lower end releasably coupled to the ballast weight, the first and second portions configured to engage with a ground surface and the frame, respectively, when the ballast weight is being loaded onto the work vehicle, and the first and second portions configured to engage with the frame when the ballast weight is loaded onto the work vehicle.

6. The ballast assembly of claim 5, wherein the first portion is positioned at one of a fore end and the aft end of the ballast weight, and the second portion is positioned at the other of the fore end and the aft end of the ballast weight.

7. The ballast assembly of claim 5, further comprising an actuator having a first end pivotally coupled to the frame and a second end pivotally coupled to the lift, the actuator being configured to rotate the lift upwards when the ballast weight is being loaded onto the work vehicle and downwards when the ballast weight is being unloaded from the work vehicle.

8. The ballast assembly of claim 5, further comprising an actuator, wherein:
   the frame comprises a left frame member and a right frame member spaced apart therefrom relative to a central fore-and-aft axis defined by the ballast assembly; and the lift comprises:
   a left pivot arm that is pivotally coupled to the left frame member,
   a right pivot arm that is pivotally coupled to the right frame member, and
   an additional arm that is pivotally coupled to one of the left frame member and the right frame member; and
   a pivot pin positioned between the additional arm and one of the left arm and the right arm, the actuator has a first end pivotally coupled to the frame and a second end pivotally coupled to the pivot pin, and the actuator is configured to rotate the lift upwards and downwards.

9. The ballast assembly of claim 5, wherein:
   the frame comprises a left frame member and a right frame member spaced apart therefrom relative to a central fore-and-aft axis defined by the ballast assembly;
   the lift comprises:
   a left pivot arm that has an upper end pivotally coupled to the left frame member about a pivot axis;
   a right pivot arm that has an upper end pivotally coupled to the right frame member about the pivot axis; and
   a central arm that is configured to engage with the ballast weight, the left pivot arm has a segment that transitions laterally inwards and a lower end that is coupled to the central arm, and the right pivot arm has a segment that transitions laterally inwards and a lower end that is coupled to the central arm; and
   the ballast weight comprises a loading slot that is configured to engage with the central arm, and the loading slot is rearward facing and is positioned along the central fore-and-aft axis.

10. The ballast assembly of claim 5, wherein the ballast weight comprises:
    a forward facing engagement slot, the forward facing engagement slot comprises a forward bottom surface, a forward top surface, and a forward facing connecting surface that connects the forward bottom surface and the forward top surface, the forward bottom surface extends farther forward than the forward top surface, the forward bottom surface engages with the frame when the ballast weight is loaded onto the work vehicle; and the rearward facing engagement slot that faces an opposite direction as the forward facing engagement slot, the rearward facing engagement slot comprises a rearward bottom surface, a rearward top surface, and a rearward facing connecting surface that connects the rearward bottom surface and the rearward top surface, the rearward bottom surface extends farther rearward than the rearward top surface, and the rearward bottom surface is the second portion engaging with the frame when the ballast weight is being loaded onto the work vehicle.

11. The ballast assembly of claim 5, wherein the ballast weight comprises a forward facing engagement slot, the forward facing engagement slot comprises a bottom surface, a top surface, and a forward facing connecting surface that connects the bottom surface and the top surface, and the bottom surface extends farther forward than the top surface, and the bottom surface engages with the frame when the ballast weight is loaded onto the work vehicle.

12. The ballast assembly of claim 11, wherein the frame comprises an actuating member, the actuating member being configured to extend into the forward facing engagement slot when the ballast weight is being loaded onto the work vehicle, and configured to slide out of the forward facing engagement slot when the ballast weight is being unloaded from the work vehicle.

13. The ballast assembly of claim 5, wherein the frame comprises a first engagement post and a second engagement post, the first and second engagement posts are configured to slide into the first and second rearward facing engagement slots, respectively, when the ballast weight is being loaded onto the work vehicle, and the first and second engagement posts are configured to slide out of the first and second rearward facing engagement slots, respectively, when the ballast weight is unloaded from the work vehicle.

14. The ballast assembly of claim 13, wherein:
the frame comprises a left frame member and a right frame member spaced apart therefrom relative to a central fore-and-aft axis defined by the ballast assembly
the first engagement post extends laterally outward from the left frame member and perpendicularly from the central fore-and-aft axis; and
the second engagement post extends laterally outward from the right frame member and perpendicularly from the central fore-and-aft axis.

15. A ballast assembly for a work vehicle, comprising:
a frame configured to be included in an underside of the work vehicle;
a ballast weight having a first portion, a second portion, and a rearward facing engagement slot, the rearward facing engagement slot having a bottom surface, a top surface, and a rearward facing connecting surface that connects the bottom surface and the top surface; and
a lift having an upper end pivotally coupled to the frame and a lower end releasably coupled to the ballast weight, the first and second portions configured to engage with a ground surface and the frame, respectively, when the ballast weight is being loaded onto the work vehicle, and the first and second portions configured to engage with the frame when the ballast weight is loaded onto the work vehicle;
wherein the bottom surface extends farther rearward than the top surface, and the bottom surface is the second portion engaging with the frame when the ballast weight is being loaded onto the work vehicle.

16. The ballast assembly of claim 15, wherein the frame comprises an engagement post configured to slide into the rearward facing engagement slot when the ballast weight is being loaded onto the work vehicle, and configured to slide out of the rearward facing engagement slot when the ballast weight is being unloaded from the work vehicle.

17. The ballast assembly of claim 15, wherein the rearward facing engagement slot is "J-shaped".

* * * * *